United States Patent [19]

de la Guardia

[11] 4,326,258

[45] Apr. 20, 1982

[54] METHOD AND APPARATUS FOR REDUCING THE GRAY SCALE RESOLUTION OF A DIGITIZED IMAGE

[75] Inventor: Mario F. de la Guardia, Miami, Fla.

[73] Assignee: NCR Canada LTD - NCR Canada LTEE, Mississauga, Canada

[21] Appl. No.: 117,329

[22] Filed: Jan. 31, 1980

[51] Int. Cl.³ .............................................. H04N 1/40

[52] U.S. Cl. .................................... 364/515; 358/282

[58] Field of Search ................ 364/515; 358/282, 283, 358/288; 235/455

[56] References Cited

U.S. PATENT DOCUMENTS

| | | | |
|---|---|---|---|
| 3,471,638 | 10/1969 | De Groat | 358/284 |
| 3,778,606 | 12/1973 | Schmitt et al. | 364/726 |
| 3,816,729 | 6/1974 | Works | 364/726 |
| 3,952,186 | 4/1976 | Speiser et al. | 364/726 |
| 4,001,500 | 1/1977 | Lavery et al. | 358/282 |
| 4,020,281 | 4/1977 | Davis, Jr. | 364/521 |
| 4,023,028 | 5/1977 | Dillard | 364/726 |
| 4,150,401 | 4/1979 | Yamamoto et al. | 358/260 |
| 4,205,341 | 5/1980 | Mitsuya et al. | 358/282 |
| 4,210,936 | 7/1980 | Cinque et al. | 364/515 |
| 4,212,072 | 7/1980 | Huelsman et al. | 364/515 |
| 4,245,258 | 1/1981 | Holladay | 364/515 |
| 4,251,837 | 2/1981 | Janeway | 358/282 |

OTHER PUBLICATIONS

Abraham, "Rotating Image Data", IBM Tech. Discl. Bulletin, vol. 21, No. 4, Sep. 1978, pp. 1424–1426.

*Primary Examiner*—Errol A. Krass
*Attorney, Agent, or Firm*—J. T. Cavender; Albert L. Sessler, Jr.; Elmer Wargo

[57] ABSTRACT

A method and apparatus for reducing the gray scale resolution of a document. The apparatus includes a scanning module for scanning a document along x and y coordinates with regard thereto for generating pixels representing gray scale values for discrete areas of the document along the x and y coordinates, with each pixel having a predetermined number of bits. A high pass filter module is also included for summing the associated pixels within a window to produce a window sum as the window is moved relatively along coordinates corresponding to the x and y coordinates, and the high pass filter module also includes means for comparing a selected pixel within a window with the associated window sum and predetermined criteria and for generating first and second output values in accordance therewith. The first and second output values have a fewer number of bits than the asssociated selected pixel.

15 Claims, 19 Drawing Figures

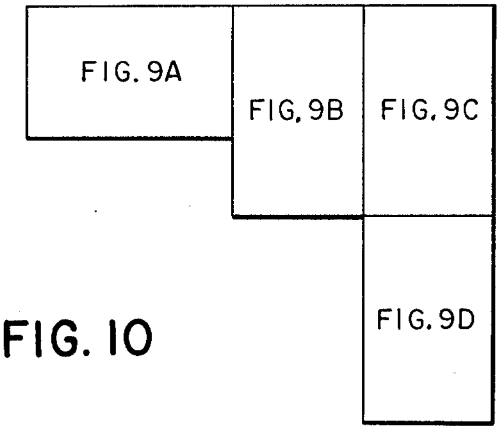
FIG. 10
FIG. 2
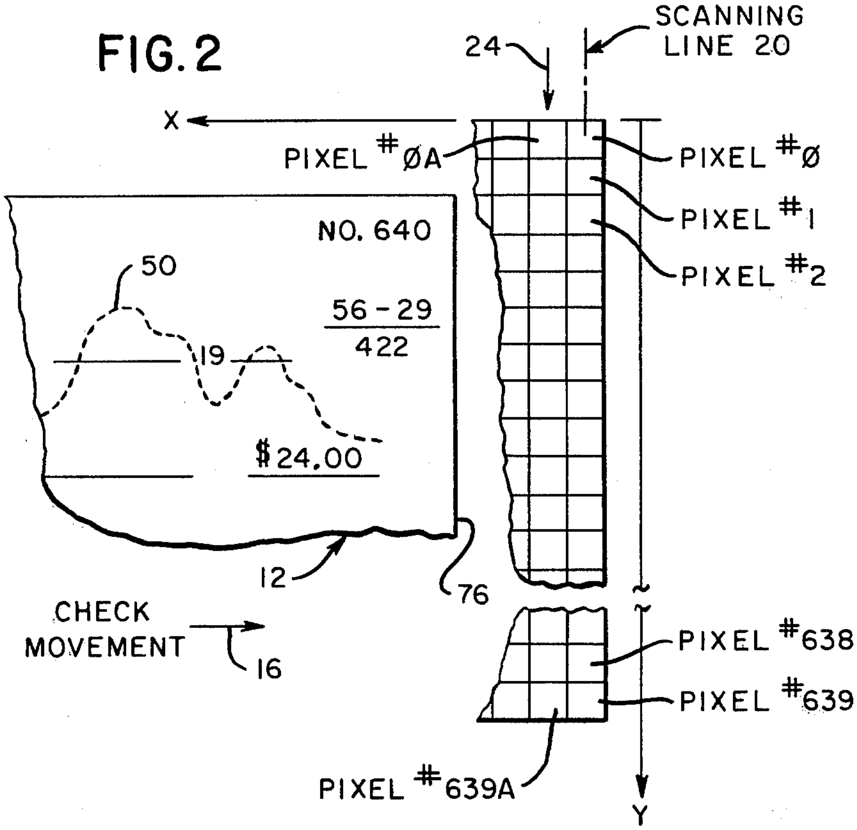

FIG. 7

```
10[ut]    H(u,0)
0.        .00
 1.000    .02
 2.000    .06 xx
 3.000    .14 xxxxx
 4.000    .24 xxxxxxxxx
 5.000    .36 xxxxxxxxxxxxxx
 6.000    .50 xxxxxxxxxxxxxxxxxxxx
 7.000    .63 xxxxxxxxxxxxxxxxxxxxxxxxx
 8.000    .77 xxxxxxxxxxxxxxxxxxxxxxxxxxxxxx
 9.000    .89 xxxxxxxxxxxxxxxxxxxxxxxxxxxxxxxxxxx
10.000   1.00 xxxxxxxxxxxxxxxxxxxxxxxxxxxxxxxxxxxxxxxx
11.000   1.09 xxxxxxxxxxxxxxxxxxxxxxxxxxxxxxxxxxxxxxxxxxx
12.000   1.16 xxxxxxxxxxxxxxxxxxxxxxxxxxxxxxxxxxxxxxxxxxxxxx
13.000   1.20 xxxxxxxxxxxxxxxxxxxxxxxxxxxxxxxxxxxxxxxxxxxxxxxx
14.000   1.22 xxxxxxxxxxxxxxxxxxxxxxxxxxxxxxxxxxxxxxxxxxxxxxxx
15.000   1.21 xxxxxxxxxxxxxxxxxxxxxxxxxxxxxxxxxxxxxxxxxxxxxxxx
16.000   1.19 xxxxxxxxxxxxxxxxxxxxxxxxxxxxxxxxxxxxxxxxxxxxxxx
17.000   1.15 xxxxxxxxxxxxxxxxxxxxxxxxxxxxxxxxxxxxxxxxxxxxxx
18.000   1.10 xxxxxxxxxxxxxxxxxxxxxxxxxxxxxxxxxxxxxxxxxxxx
19.000   1.05 xxxxxxxxxxxxxxxxxxxxxxxxxxxxxxxxxxxxxxxxxx
20.000   1.00 xxxxxxxxxxxxxxxxxxxxxxxxxxxxxxxxxxxxxxxx
21.000    .95 xxxxxxxxxxxxxxxxxxxxxxxxxxxxxxxxxxxxxx
22.000    .91 xxxxxxxxxxxxxxxxxxxxxxxxxxxxxxxxxxxx
23.000    .89 xxxxxxxxxxxxxxxxxxxxxxxxxxxxxxxxxxx
24.000    .87 xxxxxxxxxxxxxxxxxxxxxxxxxxxxxxxxxx
25.000    .87 xxxxxxxxxxxxxxxxxxxxxxxxxxxxxxxxxx
26.000    .88 xxxxxxxxxxxxxxxxxxxxxxxxxxxxxxxxxxx
27.000    .90 xxxxxxxxxxxxxxxxxxxxxxxxxxxxxxxxxxxx
28.000    .93 xxxxxxxxxxxxxxxxxxxxxxxxxxxxxxxxxxxxx
29.000    .97 xxxxxxxxxxxxxxxxxxxxxxxxxxxxxxxxxxxxxx
30.000   1.00 xxxxxxxxxxxxxxxxxxxxxxxxxxxxxxxxxxxxxxxx
31.000   1.03 xxxxxxxxxxxxxxxxxxxxxxxxxxxxxxxxxxxxxxxxx
32.000   1.06 xxxxxxxxxxxxxxxxxxxxxxxxxxxxxxxxxxxxxxxxxx
33.000   1.08 xxxxxxxxxxxxxxxxxxxxxxxxxxxxxxxxxxxxxxxxxxx
34.000   1.09 xxxxxxxxxxxxxxxxxxxxxxxxxxxxxxxxxxxxxxxxxxx
35.000   1.09 xxxxxxxxxxxxxxxxxxxxxxxxxxxxxxxxxxxxxxxxxxx
36.000   1.08 xxxxxxxxxxxxxxxxxxxxxxxxxxxxxxxxxxxxxxxxxxx
37.000   1.07 xxxxxxxxxxxxxxxxxxxxxxxxxxxxxxxxxxxxxxxxxx
38.000   1.05 xxxxxxxxxxxxxxxxxxxxxxxxxxxxxxxxxxxxxxxxxx
39.000   1.03 xxxxxxxxxxxxxxxxxxxxxxxxxxxxxxxxxxxxxxxxx
40.000   1.00 xxxxxxxxxxxxxxxxxxxxxxxxxxxxxxxxxxxxxxxx
41.000    .98 xxxxxxxxxxxxxxxxxxxxxxxxxxxxxxxxxxxxxxx
42.000    .96 xxxxxxxxxxxxxxxxxxxxxxxxxxxxxxxxxxxxxx
43.000    .94 xxxxxxxxxxxxxxxxxxxxxxxxxxxxxxxxxxxxx
44.000    .93 xxxxxxxxxxxxxxxxxxxxxxxxxxxxxxxxxxxxx
45.000    .93 xxxxxxxxxxxxxxxxxxxxxxxxxxxxxxxxxxxxx
46.000    .93 xxxxxxxxxxxxxxxxxxxxxxxxxxxxxxxxxxxxx
47.000    .95 xxxxxxxxxxxxxxxxxxxxxxxxxxxxxxxxxxxxxx
48.000    .96 xxxxxxxxxxxxxxxxxxxxxxxxxxxxxxxxxxxxxx
49.000    .98 xxxxxxxxxxxxxxxxxxxxxxxxxxxxxxxxxxxxxxx
READY
```

FIG. 8

MEAN = 58 STD. DEV. = 9.45 SAMPLES = 65536

BLACK = Ø

WHITE = 63

| | | |
|---|---|---|
| Ø | 9 | X |
| 2 | 8 | X |
| 4 | 17 | X |
| 6 | 183 | XXXXX |
| 8 | 5Ø | XX |
| 1Ø | 74 | XX |
| 12 | 147 | XXXX |
| 14 | 98 | XXX |
| 16 | 228 | XXXXXX |
| 18 | 129 | XXX |
| 2Ø | 255 | XXXXXX |
| 22 | 27Ø | XXXXXX |
| 24 | 132 | XXX |
| 26 | 256 | XXXXXX |
| 28 | 133 | XXXXXXX |
| 3Ø | 274 | XXXXXXX |
| 32 | 166 | XXXX |
| 34 | 371 | XXXXXXXXX |
| 36 | 453 | XXXXXXXXXXX |
| 38 | 33Ø | XXXXXXXX |
| 4Ø | 7Ø5 | XXXXXXXXXXXXXXXX |
| 42 | 4Ø7 | XXXXXXXXXX |
| 44 | 1Ø14 | XXXXXXXXXXXXXXXXXXXXXXX |
| 46 | 1214 | XXXXXXXXXXXXXXXXXXXXXXXXXXX |
| 48 | 688 | XXXXXXXXXXXXXXXX |
| 5Ø | 1582 | XXXXXXXXXXXXXXXXXXXXXXXXXXXXXXXXXXX |
| 52 | 774 | XXXXXXXXXXXXXXXXXX |
| 54 | 1621 | XXXXXXXXXXXXXXXXXXXXXXXXXXXXXXXXXXXX |
| 56 | 2214 | XXXXXXXXXXXXXXXXXXXXXXXXXXXXXXXXXXXXXXXXXXXXXXXXXX |
| 58 | 1838 | XXXXXXXXXXXXXXXXXXXXXXXXXXXXXXXXXXXXXXXXX |
| 6Ø | 8648 | XXXXXXXXXXXXXXXXXXXXXXXXXXXXXXXXXXXXXXXXXXXXXXXXXXXX |
| 62 | 43263 | XXXXXXXXXXXXXXXXXXXXXXXXXXXXXXXXXXXXXXXXXXXXXXXXXXXX |

METHOD AND APPARATUS FOR REDUCING THE GRAY SCALE RESOLUTION OF A DIGITIZED IMAGE

BACKGROUND OF THE INVENTION

This invention relates to a method and apparatus for reducing the gray scale resolution of a digitized image.

In certain operations, it is necessary to produce a digitized image of a document, which image is further processed or transmitted to a utilization device. For example, in a particular banking system, it is necessary to produce digitized images of documents such as checks or deposit slips which digitized images are utilized in the system for banking and accounting purposes. One of the problems with at least some of the checks is that they contain background pictorial scenes which do not contain information which is useful within the system and these scenes have to be eliminated from the associated digitized images so as to minimize, for example, the associated transmission times and storage requirements for these images.

The pictorial scenes on the checks are generally faint or light in color or density compared to the useful data such as monetary amounts or pre-printed account numbers, for example, on the checks. When a check is scanned to produce a digitized image thereof, the scanning is done by dividing the check into a plurality of picture elements (which will be referred to hereinafter as "pixels"), with each pixel having a particular gray level associated therewith. For example, in the embodiment to be described herein, a pixel can have any one of 64 gray levels associated therewith, ranging from completely black to completely white, although the particular number of levels can be changed to suit particular applications. With 64 gray levels, 6 binary bits of data are required to describe each pixel, and with an image resolution of 154 pixels per inch, for example, it can be appreciated that a large amount of storage space would be required to store the digitized image of a check which typically is approximately 3 inches by 6 inches in area.

It was noticed that the background or pictorial scenes on a check change very slowly in gray levels when proceeding from one pixel to another pixel as compared to the gray levels associated with adjacent pixels which contain the desired useful data such as account number or amount. For example, there is a very abrupt change in the gray levels when proceeding from a background pixel to a pixel containing a portion of an account number. This feature, along with comparing each pixel with a surrounding group of pixels included in an examination area or "window", provides a basis for reducing the number of gray levels associated with a particular digitized image.

SUMMARY OF THE INVENTION

This invention relates to a method and apparatus for reducing the gray scale resolution of a document. The apparatus includes means for scanning a document along x and y coordinates with regard thereto for generating pixels representing gray scale values for discrete areas of the document along the x and y coordinates, with each pixel having a predetermined number of bits. Means are also included for summing the associated pixels within a window to produce a window sum as the window is moved relatively along coordinates corresponding to the x and y coordinates, and the apparatus also includes means for comparing a selected pixel within a window with the associated window sum and predetermined criteria and for generating first and second output values in accordance therewith. The first and second output values have a fewer number of bits than the associated selected pixel.

BRIEF DESCRIPTION OF THE DRAWING

FIG. 2 is a schematic diagram of a portion of a check about to be scanned by the scanner module shown in FIG. 1;

FIG. 7 is a graph of a transfer function;

FIG. 8 is a histogram showing a typical range of samples in an image, ranging from completely black to completely white;

FIG. 10 is a diagram showing how the FIGS. 9A through 9D are arranged to form a composite figure.

DETAILED DESCRIPTION OF THE INVENTION

Figure 1:
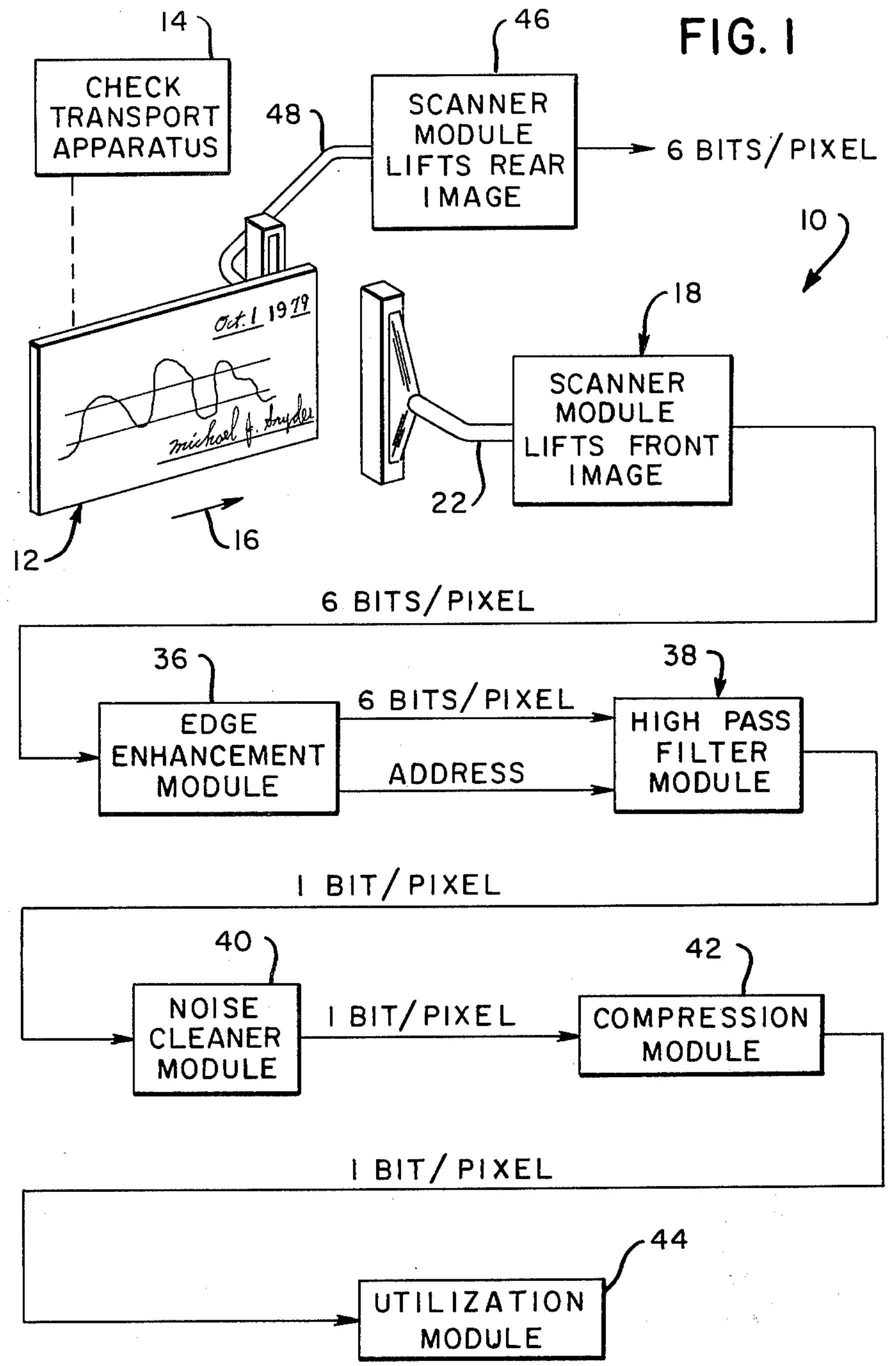
FIG. 1 is a schematic diagram, in block form, of a system which is utilized for producing a digitized image of a document such as a check, and which system includes the means for reducing the gray scale resolution of a digitized image, which said means is shown therein as a high pass filter module.

FIG. 1 is a schematic diagram, in block form, of a system designated generally as 10 which is utilized for producing a digitized image of a document such as a check 12. A conventional check transport means or apparatus 14 is utilized to move the check 12 in the direction of arrow 16 past a conventional scanning means (hereinafter called scanner module 18) for scanning the image on the front of the check 12.

Figure 3:
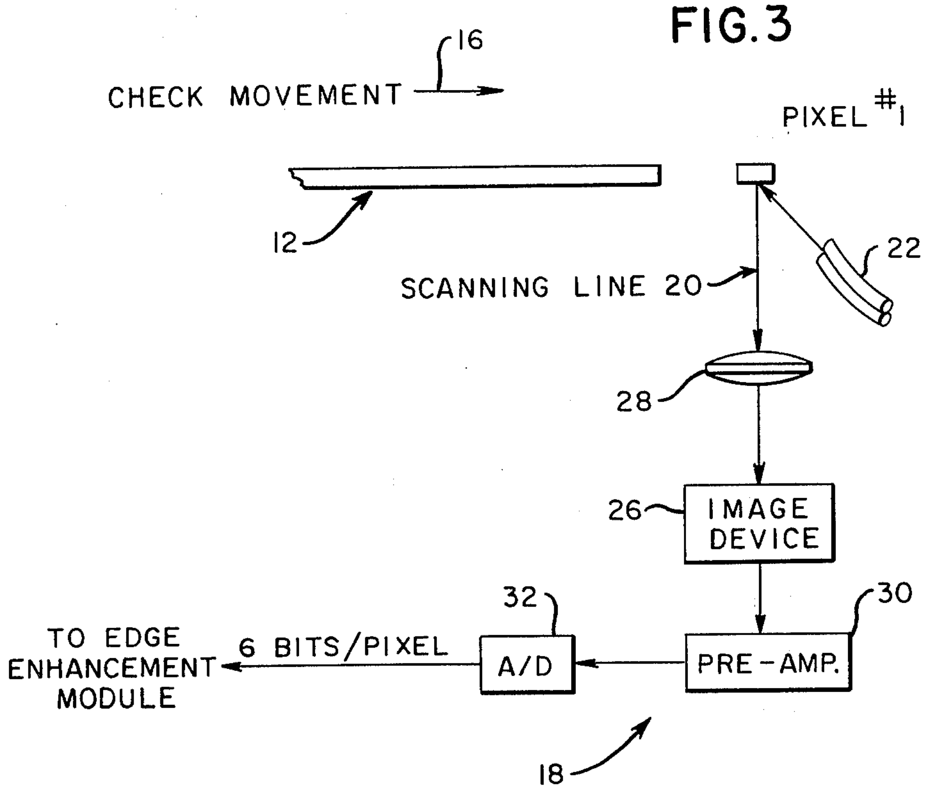
FIG. 3 is a schematic diagram of the elements included in the scanner module, showing also the top edge of the check shown in FIG. 1.

FIG. 2 is a schematic diagram of the upper right hand portion of the check 12 as it is about to be moved to the scanning line 20 associated with the scanning module 18. Conventional optical fibers 22 (FIGS. 1 and 3) are utilized to illuminate the scanning line 20, and scanning is effected along this line in the direction shown by arrow 24 in FIG. 2.

In the embodiment selected to portray this invention, the documents like check 12 are considered as being scanned in picture elements or "pixels" which are square in shape as shown by pixels #ϕ through 639 in FIG. 2; these pixels are shown greatly exaggerated in size so as to facilitate an understanding of the scanning technique employed. When the right most edge of the check 12 (as viewed in FIG. 2) reaches the scanning line 20, the particular gray scale values associated with this edge of the check will be imaged on to the light receptive elements in the imaging device 26 (FIG. 3) by the optical system shown as a lens 28. A conventional edge detector (not shown) may be used to initiate the start of the scanning. The imaging device 26 is conventional such as a Fairchild #131 imaging device, and while this device has 1024 active elements therein, only 640 of these elements (corresponding to pixels #ϕ—#639) are used in the embodiment described herein, although different numbers of active elements and particular equivalent devices may be used depending upon particular applications.

The outputs of the active elements in the imaging device 26 (FIG. 3) are conventionally amplified in a preamplifier 30 and they are converted to corresponding gray scale values by a conventional analog to digital (A/D) converter 32. In the embodiment being described, a particular pixel may have any one of 64 gray scale values, ranging from completely "black" to completely "white"; consequently, six binary bits of data are necessary for each pixel, and the data stream 33 being outputted from the A/D converter 32 has the format shown in FIG. 4 for each complete scan (from pixel #ϕ through #639) along the scan line 20 (FIG. 2).

As the check 12 is moved further to the right (as viewed in FIG. 2), a second complete scan is made along the scanning line 24. This second scan is shown diagrammatically as pixels #ϕA through #639A along the Y direction in FIG. 2. As similar scans are made at the scanning line 20, the data stream 33 (FIG. 4) for each scan is eventually stored in a buffer memory 34 (FIG. 5) as will be described hereinafter. While X and Y coordinates are shown for orientation in FIG. 2, the pixels #ϕ through #639 for each scan do not contain X and Y coordinates; the sequential order of the scans is relied upon for reconstructing the digitized image of the check 12 as will be described hereinafter.

The output of the scanner module 18 (6 bits per pixel) is fed into a conventional edge enhancement module 36 shown in FIG. 1; this module 36 sharpens the edges of the digitized images and its output, which is also six bits per pixel, is fed into the means for reducing the gray scale resolution of the digitized image of check 12 which means will hereinafter be referred to as a high pass filter module 38. This module 38 then reduces the gray scale resolution of each pixel from 6 bits to one bit by a technique and circuits to be later described herein. The output of the module 38 (1 bit per pixel) is then processed by a conventional noise cleaner module 40 and a conventional compression module 42 whose output is fed to a utilization module 44 which may, for example, be banking or accounting apparatus as earlier described herein.

A second scanner module 46 (FIG. 1) identical to module 18 is utilized to scan the rear of the check 12 as the front is being scanned by the module 18. The scanner module 46 utilizes fiber optics 48 to illuminate the rear of the check 12 as previously described in relation to module 18, and the output of module 46 is also 6 bits per pixel as previously described. The scanning lines (like 20) for the modules 18 and 46 are slightly displaced from each other along the direction of arrow 16 to prevent the modules 18 and 46 from affecting each other.

The output of the scanner module 46 is similarly processed by an edge enhancement module, high pass filter module, noise cleaner module, and compression module (all not shown but similar to modules 36, 38, 40, and 42, respectively) and the resulting output is fed into the utilization module 44.

As earlier stated herein, the high pass filter module 38 (FIG. 1) is utilized to suppress unwanted background information on a document such as check 12. Such unwanted information is represented on check 12 (FIG. 2) by mountain scenery 50 shown by a dashed line; the other numbers and lines shown on check 12 represent the usual data recorded on a check.

Before proceeding with a detailed discussion of the method and apparatus for reducing the gray scale resolution of a digitized image, it would be useful to discuss the theory of operation used with this invention.

In general, the unwanted background material 50 on the check 12 (FIG. 2) represents the low spatial frequency components of the digitized image, while the dark areas like No. 640, for example, and the monetary amount represent the high spatial frequency components. The low spatial frequency components are the ones which are suppressed by the high pass filter module 38 and replaced by "white" areas to reduce the number of gray levels in the digitized image. In the preferred embodiment, the number of gray levels per pixel is reduced from 64 to 2, (i.e., either black or white) by comparison techniques to be later described herein. The number of bits per pixel is also reduced from 6 to 1. The resulting digitized image coming out of the high pass filter module 38 has the following advantages over the digitized image entering it:

(1) As the number of gray levels is reduced, the number of bits per pixel is reduced, bringing about a reduction in the total number of bits for the entire digitized image, thereby requiring less storage space and less transmission time;

(2) When data compression techniques are applied, a higher compression ratio is achieved due to the background images being replaced by "white" areas;

(3) Alphanumeric characters appearing on the check having a complex background are more human and machine readable due to the "cleaning" of the background; and (4) The reduction in storage space and transmission time provide a cost reduction and a higher throughput rate for a system using the resulting digitized image.

Before proceeding with a discussion of the method and apparatus of this invention, it appears appropriate to discuss the mathematics involved therein.

Figure 4:
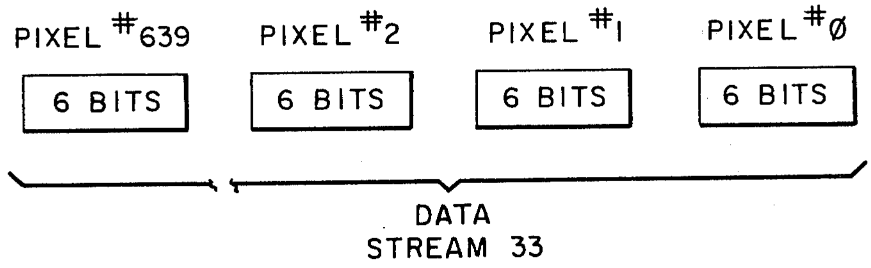
FIG. 4 is a diagrammatic showing of a data stream as it emanates from the scanner module shown in FIGS. 1 and 3.

In this regard, a digitized picture can be considered as a continuous function f (x,y) whose value is the gray level at a point (x,y), and whose domain is $\phi \leqq x \leqq M$ and $\phi \leqq y \leqq N$. If $\phi$ is "black" and K is "white", then $$\phi \leqq f(x,y) \leqq K \qquad \text{Eq. \#1}$$

for all points (x,y). Equation #1 can represent any function, such as the data stream 33 (FIG. 4).

A high pass filtered picture (z) is obtained by subtracting (f) convolved with (w) from (f), i.e., $$z = f - [fw] \qquad \text{Eq. \#2}$$

wherein $$w(x,y) = \begin{cases} \frac{1}{T^2}, \text{ for } \frac{-T}{2} \leq x \leq \frac{T}{2}, \frac{-T}{2} \leq y \leq \frac{T}{2} \\ \phi, \text{ elsewhere.} \end{cases} \quad \text{Eq. \#3}$$

Figure 6:
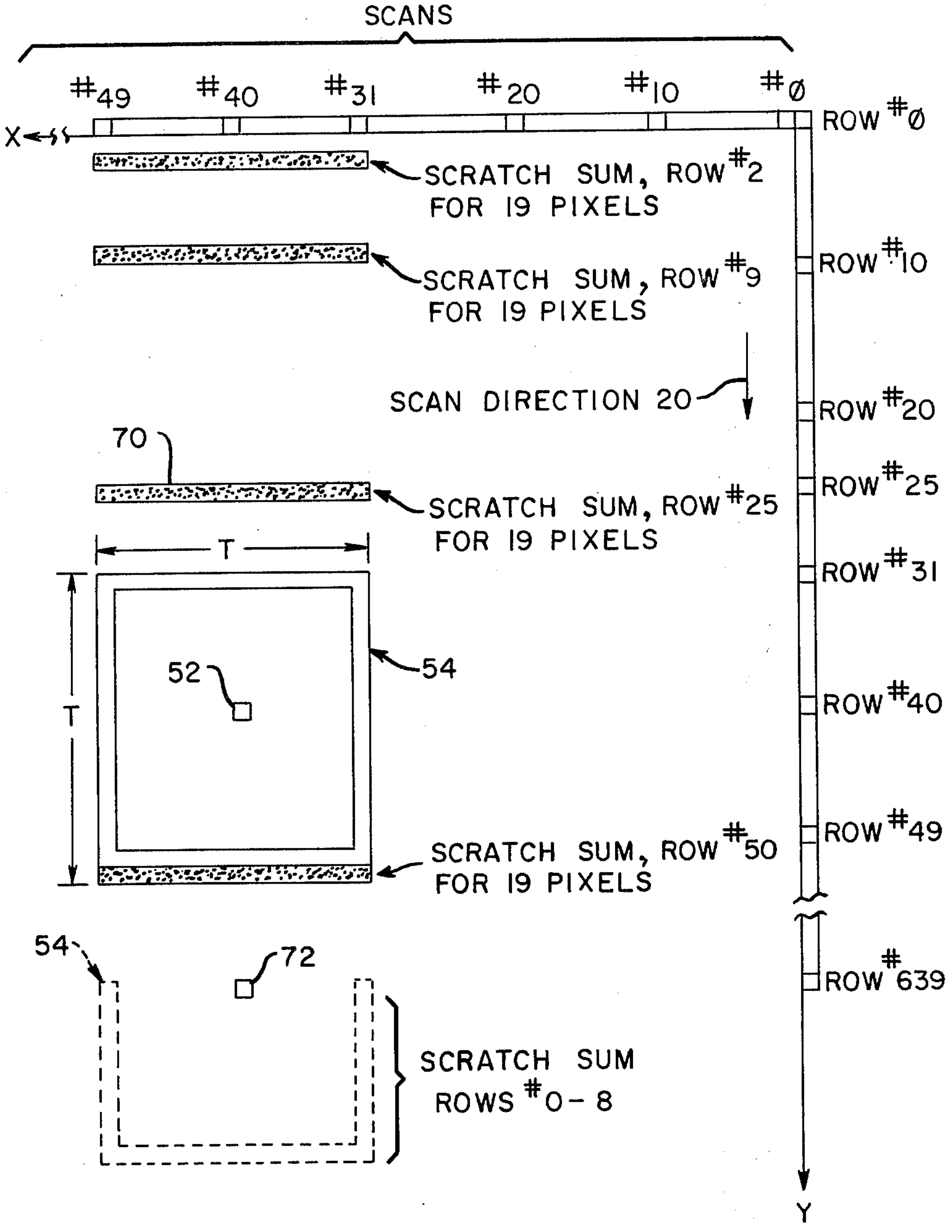
FIG. 6 is a schematic diagram showing how a window is utilized to compare a central pixel with its surrounding pixels included in the window.

The filtered picture z (Eq. #2) represents the total of all the pixels within any one image being scanned, i.e., the entire check 12; however, it does not mean that all the pixels in the data stream 33 are numerically added. The term "convolved" as used in this paragraph refers to a mathematical treatment, and in general it refers to taking a window and moving the window up and down over an entire area in order to examine what is within the window. In this regard FIG. 6 shows the various pixels associated with a portion of the digitized image of check 12. Pixels #ϕ through #639 are shown along the Y direction and each of the successive scans is shown along the X direction. For illustration purposes, a central pixel 52 is shown within a window 54. This central pixel 52 is located in row #40 along the Y direction and results from scan #40 located along the X direction. In the embodiment being described, the window 54 contains 19×19 pixels (in the X and Y directions), consequently, the pixels from rows #31 through #49 along the Y direction and the pixels resulting from scans #31 through #49 for these rows are included within the window 54. The X and Y coordinates shown are considered positive. The central pixel 52 is compared with the surrounding pixels included in the window 54 (by techniques to be later described herein) and then the window is moved in discrete jumps to compare the next central pixel with its surrounding pixels. Convolution as used herein means moving the window 52 over the entire area within the X and Y coordinates of the entire digitized image.

With regard to Eq. #3, the letter T therein refers to the square window width shown as T×T in FIG. 6. The value of T was selected so that the entire height of a preselected character on the check 12 would fit within the window 54. In the embodiment being described, the value of T is 19 pixels for a spatial resolution of 154 pixels per inch. The values of X and Y in Eq. #3 are shown as having a range from −T/2 to +T/2; this merely represents a mathematical treatment which signifies that the center of the window like 54 in FIG. 6 is located at the origin of an associated X and Y coordinate system, and with this treatment, the data (like the pixels) are moved under the stationary window according to or along the appropriate X and Y axes to effect the discrete scanning of the window along the image. The ϕ for "elsewhere" in Eq. #3 simply means that when the value of X or Y is outside the window, w becomes zero. The filter represented by the general Eq. #2 attenuates the spatial frequencies below 1/T, and as previously stated, T was selected so that the entire height of a preselected character on the check 12 fits inside the window 54.

The Eq. #2 can then be written as:

$$z(x,y) = f(x,y) - \int_{-\infty}^{\infty} \int_{-\infty}^{\infty} f(\alpha,\beta) w(x - \alpha, y - \beta) d\alpha d\beta \quad \text{Eq. \#4}$$

The portion of Eq. #4 which is within the bracket shown represents the convolution term relating to the convolution previously discussed, and the alpha and beta functions within the convolution term, going from − infinity to + infinity, represent moving the window 54 over the entire image (FIG. 6).

In Eq. #4, Fourier transforms may be relied upon to provide a solution. Fourier transforms generally relate to the frequency domain and are easier to solve than equations of the type shown by Eq. #4 which relates to the time domain.

In this regard, if Z, F, and W are the corresponding transforms of z, f, and w previously defined, then:

$$Z(u,v) = F(u,v) - F(u,v)\ W(u,v), \quad \text{Eq. \#5}$$

and $$Z(u,v) = [1 - W(u,v)]F(u,v). \quad \text{Eq. \#6}$$

Eq. #5 is the corresponding Fourier transform for Eq. #4, and Eq. #6 is a simplification of Eq. #5 and defines what the window (like 54 in FIG. 6) sees with regard to a rapid change in frequency. This window is analogous to a filter which permits the rapidly changing frequencies to pass therethrough and which screens out the slower changing frequencies which represent background information on the check 12 which it is desired to suppress. With regard to Eq. #5 and Eq. #6, the terms u and v used therein represent spatial frequencies and the associated transfer function H of the associated filter is defined as:

$$H(u,v) = 1 - W(u,v). \quad \text{Eq. \#7}$$

The term W in Eq. #7 is what is commonly referred to as a gate function in that what is not within the associated parameters is ignored. In effect, the gate function may be considered as a window which is viewing data to be processed. The format of a Fourier transform of a gate function like g(x) is G(w), and in electronics, this represents a low pass filter; and the corresponding format of a high pass filter is $1-G(w)$. From Eq. #3 and Eq. #7, the transfer function H becomes, by the usual mathematical treatment:

$$H(u,v) = 1 - \frac{\sin \pi u T}{\pi u T} \cdot \frac{\sin \pi v T}{\pi v T} \quad \text{Eq. \#8}$$

FIG. 7 is a graph of the above transfer function for v=0. The u frequency axis has been multiplied by a factor of 10 T to simplify the plotting of the function from a computer print-out.

From Eq. #1 wherein ϕ≦f(x,y)≦K, and ϕ is "black" and K is "white", a new picture or data stream g is obtained by adding the constant $K_1$ to the filtered picture z and making all the values of g greater than K equal to K, i.e., all the values of g which are greater than K become "white". This is known as truncation as one cannot have a value of white which is "whiter" than "white". This new picture g becomes:

$$g(x,y) = z(x,y + K_1 \quad \text{Eq. \#9}$$

Utilizing the format of Eq. #9, Eq. #3 and Eq. #4 are combined to form:

$$g(x,y) = f(x,y) - \frac{1}{T^2} \int_{x - \frac{T}{2}}^{x + \frac{T}{2}} \int_{y - \frac{T}{2}}^{y + \frac{T}{2}} f(\ ,B) d\ dB + K \quad \text{Eq. \#10}$$

With regard to Eq. #10, if for any point $(x_1 y_1)$, where $g(x_1, y_1) > K$, then set $g(x_1, y_1) = K$; this performs the truncation mentioned earlier in this paragraph.

The previous discussions and equations disclosed herein relate to continuous functions; however, the discussion which follows relates to discrete functions.

A digitized picture or image can be represented by a matrix of MxN pixels with M lines and N pixels per line. The discrete function f is as follows:

$$f = [f_{ij}] \text{ matrix with elements } f_{ij} \qquad \text{Eq. \#11}$$

wherein, $$\phi \leqq i \leqq M-1, \text{ and } \phi \leqq j \leqq N-1. \qquad \text{Eq. \#12}$$

Eq. #12 sets the limits for i and j wherein $f_{ij}$ is an n-bit binary number representing one of the $2^n$ gray levels discussed earlier herein. In this regard, $K = 2^n - 1$, and $\phi \leqq f_{ij} \leqq K$ wherein $\phi$ is "black" and K is "white". In the present embodiment, six bits or $n = 6$ is used; however, almost any convenient bit number could be utilized for the number of bits per pixel.

The following discrete equation corresponds to Eq. #10 which is continuous function, $$g_{ij} = f_{ij} - \underbrace{\frac{1}{T^2} \sum_{m=i-r}^{i+r} \sum_{n=j-r}^{j+r} f_{mn} + K,} \qquad \text{Eq. \#13}$$

wherein $r = T - 1/2$.

In order to make r an integer number of pixels, T must be an odd number. The term $f_{ij}$ in Eq. #13 represents the low plus the high frequencies, and the term within the bracket shown therein represents the low frequencies; consequently, Eq. #13 represents the high pass filter 38 shown in FIG. 1, i.e., the low frequencies are subtracted from the low and high frequencies. With regard to Eq. #13, for any point $g_{ij} > K$, set $g_{ij} = K$; this simply means that the pixel value or binary number is not permitted to exceed 6 bits in the embodiment being described. Accordingly, the new picture or digitized image is defined as, $$g = [g_{ij}], \qquad \text{Eq. \#14}$$

i.e. a matrix with elements $g_{ij}$, wherein: $\phi \leqq i \leqq M-1$, and $\phi \leqq j \leqq N-1$.

The final output picture or digitized image P is obtained by reducing the total number $(K+1)$ of gray levels of g (from Eq. #14) to a number $L+1$ where $L << K$. The expression "$L << K$" means that L is considerably less than K. It should be recalled that the function of the high pass filter module 38 shown in FIG. 1 is to reduce the number of bits per pixel from 6 entering the module to one bit per pixel in leaving it. By reducing the number of bits per pixel to some number $\alpha$, for example, then the number of gray levels is equal to $2^\alpha$.

The final digitized image output P is obtained by comparing $g_{ij}$ with a set of constant threshold values $T_n$, wherein $1 \leqq n \leqq L$, and $$\phi < T_1 < T_2 < \ldots < T_L < K. \qquad \text{Eq. \#15}$$

The various threshold limits for a point $g_{ij}$ may be set as follows:

$$\text{If } \phi \leqq g_{ij} < T_1, \qquad \text{Eq. \#16}$$

then set $P_{ij} = \phi$ $$\text{If } T_1 \leqq g_{ij} < T_2, \qquad \text{Eq. \#17}$$

then set $P_{ij} = 1$ $$\text{If } T_n \leqq g_{ij} < T_{n+1}, \qquad \text{Eq. \#18}$$

then set $P_{ij} = n$ $$\text{If } T_L \leqq g_{ij} < K, \qquad \text{Eq. \#19}$$

then set $P_{ij} = L$

The output picture or digitized image P is:

$$P = [P_{ij}] \text{ matrix with elements } P_{ij}, \qquad \text{Eq. \#20}$$

wherein: $\phi \leqq P_{ij} \leqq L$, and in which $\phi$ is "black" and L is "white" instead of K being white, i.e., $L << K$.

FIG. 8 shows a histogram of the individual points of a digitized picture, showing an increasing population as the level value progresses from "$\phi$" which is black to K which is white. The threshold values for a histogram such as the one shown in FIG. 8 as set in increasing values are as follows:

$$K - T_L < T_L - T_{L-1} < \ldots < T_2 - T_1 < T_1. \qquad \text{Eq. \#21}$$

Eq. #21 attempts to position the threshold values with regard to the distribution of values in the histogram of FIG. 8 as contrasted with utilizing a lineal set of threshold values which would simply position the threshold values equally among the gray levels of a histogram as expressed in:

$$K - T_L = T_L - T_{L-1} = \ldots = T_2 - T_1 = T_1. \qquad \text{Eq. \#22}$$

To obtain a black and white output $P_{ij}$, one having one bit per pixel from the high pass filter module 38 (FIG. 1) or two binary states, the individual pixel $g_{ij}$ is compared with a single constant value $T_1$ and $P_{ij}$ is made equal to $\phi$ if $g_{ij}$ is smaller than $T_1$; otherwise $P_{ij}$ is made equal to 1, with $\phi$ being black and 1 being white. This aspect will be discussed in more detail hereinafter.

The high pass filter module 38 (FIG. 1) may be implemented by either a software embodiment or a hardware embodiment.

Figure 5:
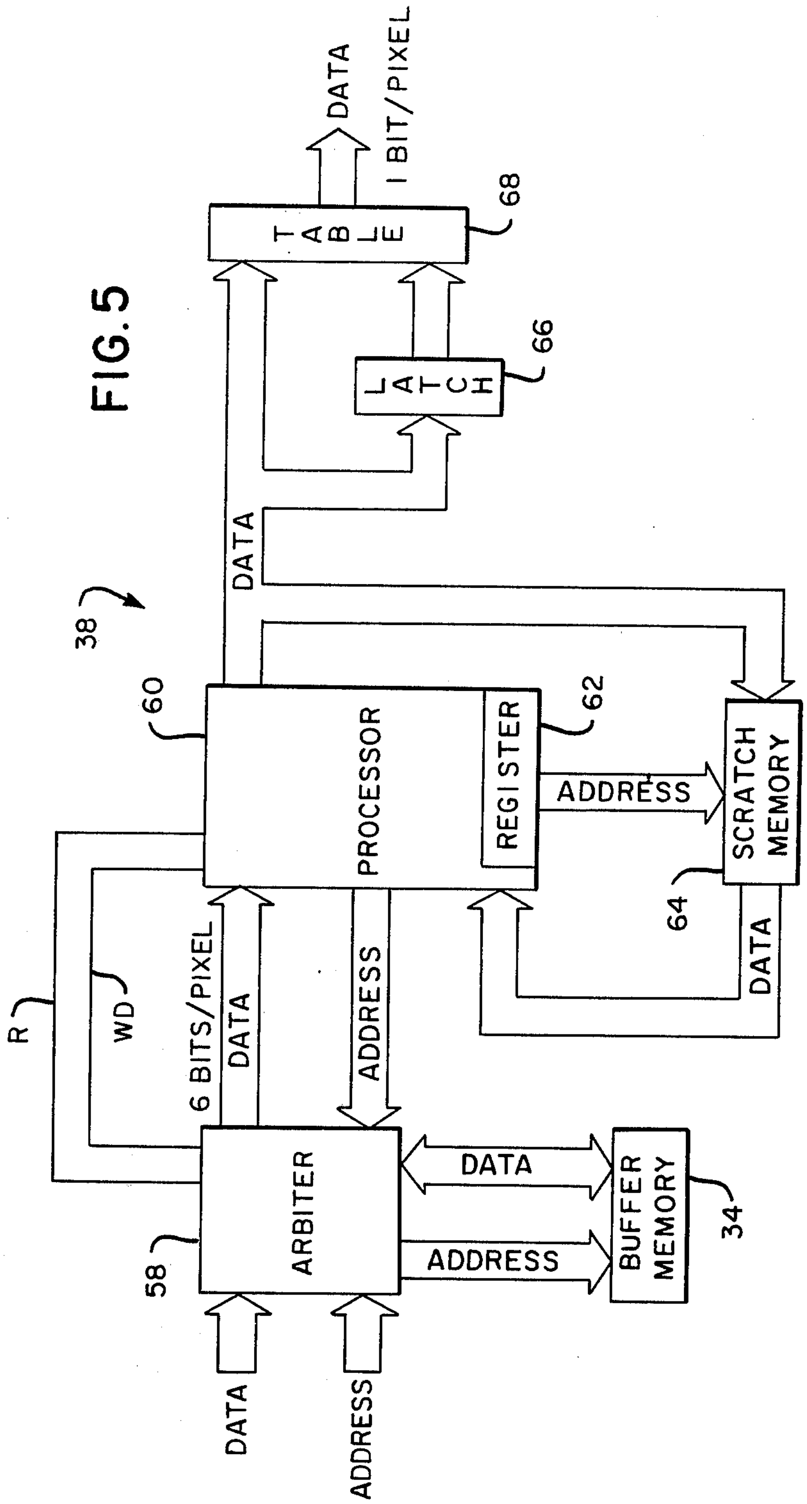
FIG. 5 is a schematic circuit, in block form, of a preferred embodiment of this invention.

FIG. 5 is a general schematic diagram, in block, of a hardware embodiment of the high pass filter module 38 shown in FIG. 1.

The high pass filter module 38 (FIG. 5) includes an arbiter 58, a processor 60 having a general register 62 associated therewith, a scratch memory 64, the buffer memory 34, a latch 66 and a decoding device or look-up table hereinafter called table 68. The data coming into the arbiter 58 contains 6 bits per pixel and the data leaving the table 68 contains 1 bit per pixel as previously explained.

One purpose of the arbiter 58 (FIG. 5) is to receive data from the edge enhancement module 36 (FIG. 1) on a line by line basis (from the scans) or pixel by pixel basis and to load it into a given line in the buffer memory 34 where the data is stored. Another purpose of the buffer memory 34 is to transfer the pixel data on an ordered pixel by pixel basis to the processor 60. Essentially, the arbiter 58 resolves when the edge enhancement module 36 writes into the buffer memory 34 and when the processor 60 reads from the buffer memory 34; these are time-multiplexed decisions made by the arbiter 58.

The buffer memory 34 (FIG. 5) is used to store a portion of the digitized image as it comes from the edge enhancement module 36 (FIG. 1). The memory 34 stores an image containing T+2 scan lines with N pixels $b_{ij}$ per line wherein:

$$b = [b_{ij}], \text{ and } \phi \leqq i \leqq T+1, \text{ and } \phi \leqq j \leqq N-1. \quad \text{Eq. \#23}$$

In this regard, FIG. 2 shows a scan line (i) with 640 pixels (N) going from pixel $\phi$ to pixel 639 along the y direction. The T+2 lines mentioned relate to storing 19 scan lines for the window size (window 54 shown in FIG. 6) plus one scan line being added and 1 line for the old scan line being dropped off as will be described later herein.

The scratch memory S (64 in FIG. 5) is arranged in an array of N elements with each element representing a sum of T pixels (which in the embodiment being described is 19 pixels) wherein:

$$S=[S_j], \text{ wherein } \phi \leqq j \leqq N-1. \quad \text{Eq. \#24}$$

For example, in FIG. 6 the scratch sum for 19 pixels along the x direction for row #25 is represented by the area shown by reference numeral 70 and this sum is obtained for each row with j going from Row #0 through Row #639 along the Y direction. In other words, the scratch memory 64 maintains 640 totals with each total representing a sum in the X direction (like sum #70 in FIG. 6) for 19 pixels or T in which is the size of window 54.

With regard to FIG. 6, the size of window 54 is T×T pixels or 19×19. For example, the window 54 contains the scratch sums (for 19 pixels in the X direction) for Rows #31 through Row #49 for the scans (in the Y direction) #31 through #49. The center pixel 52 in the window 54 results from the scan #40 (in the X direction) and is located in Row #40 (in the Y direction).

In general, the processor 60 (FIG. 5) accesses the buffer memory 34 to obtain the pixels for the various scans and computes the sum of the pixels within the window 54 (FIG. 6) and saves this value R within the register 62 and outputs this value to the latch 66. The center pixel 52 (FIG. 6) for the window 54 is then read from the buffer memory 34 and routed to the table 68. The sum of the pixels for the window 54 and the value of the center pixel 52 for the window are used as addresses for the table 68 to obtain the output of the table, which output is 1 bit per pixel as previously explained. The window 54 (FIG. 6) is then moved downwardly (relatively, in FIG. 6) along the Y axis for 1 row and the scratch sum for Row #31 is deleted or subtracted from the sum of the values in the window 54 (stored in the register 62) and the scratch sum for Row #50 is added to the values in the window 54 in the R register 62. Thus, the processor 60 then computes the sum of the pixels within the window 54 and outputs this value to the latch 66, and the center pixel which is now located in Scan #40 for Row #41 is then routed to the table 68 to provide the addresses for the table 68 to obtain the output from table 68 which is one bit per pixel. The R register 62 is continually updated by dropping off or subtracting the scratch sum for the oldest Row and adding the scratch sum for the next adjacent Row as the window 54 proceeds downwardly along the Y direction in FIG. 6. The scratch memory 64 is arranged to contain 640 scratch sums with each scratch sum containing the value for 19 pixels. As the window 54 moves towards the scratch sum for Row #639, it begins to pick up some of the scratch sums for Rows #0 through Row #8. For example, when the window 54 is centered about the pixel 72 which is located in Scan #40 and the scratch sum for Row #639, the scratch sums for Rows #0 through #8 are included within the window 54. These scratch sums for Rows #0 through #8 are the same ones from the top of FIG. 6 and may represent generally, border material on top of the document 12. In this regard, the scratch memory 64 may be considered as being an "endless-type" memory. The window is updated with one scratch sum (of the 640 scratch sums) being added, and the oldest scratch sum being deleted. It was felt that this type of memory arrangement provided the simplest construction with a minimum of error because the area in the border at the bottom of the check 12 is substantially the same as the top border of the check 12. After the window has been moved downwardly along the Y direction with the center pixel starting in Row #$\phi$ and scan line #40, and ending at Row #639 and scan line #40, the window 54 is moved one pixel to the left (as viewed in FIG. 6); this process is repeated. Now, the center pixel 52 is moved along the scan line #41. The pixel values associated with Scan #31 for Rows #0 through #639 are then dropped off or subtracted, and the pixel values for Scan #50 are added to the scratch sums for Rows #0 through #639 as will be described hereinafter, and the process described is repeated.

The sum of the average value of the pixels within the window 54 (FIG. 6) which is accumulated in the register 62 has the value R which is as follows:

$$R = \sum_{m=i-r}^{i+r} \sum_{n=j-r}^{j+r} f_{mn} \quad \text{Eq. \#25}$$

in which $f_{ij}$ is the center pixel, such as 52 in FIG. 6. The letter r in Eq. #25 is equal to (T−1)/2 as already discussed in relation to Eq. #13. R in Eq. #25 is contained within the bracket of Eq. #13.

The table 68 (FIG. 5) is essentially a decoding device which contains a set of constant values which is used to obtain the values for $P_{ij}$. The value of R derived from Eq. #25 and placed in latch 66 and the center pixel (like 52 in FIG. 6) are used as inputs or addresses to the table 68 and $P_{ij}$ having one bit/pixel is the output therefrom. With this in mind, Eq. #13, which represents the high pass filter 38 (FIG. 1), can be rewritten using the definition of R from Eq. #25 as follows:

$$g_{ij}=f_{ij}-R/T^2+K. \quad \text{Eq. \#26}$$

Equation #26 is implemented in the table 68, and $$P_{ij}=\phi, \text{ if } \phi \leqq g_{ij} < T_1 \quad \text{Eq. \#27}$$

and $$P_{ij}=1, \text{ if } T_1 \leqq g_{ij} < K. \quad \text{Eq. \#28}$$

Equations #27 and #28 are analogous to threshold Eq. #16 and Eq. #17, respectively, which were previously discussed. A generalized expression for thresholds is:

$$P_{ij}=n, \text{ if } T_n \leqq g_{ij} < T_n+1, \text{ wherein} \quad \text{Eq. \#29}$$

-continued $$\phi < T_1 < T_2 < \ldots < T_n < \ldots < T_L < K \text{ represents a set of constant threshold values, with } \phi \text{ being black and } L \text{ being white.} \quad \text{Eq. \#30}$$

With regard to the table 68 (FIG. 5), let TABLE be equal to the function represented by table 68. The output of the table 68 is:

$$P_{ij} = \text{TABLE}\ (R, f_{ij}) \quad \text{Eq. \#31}$$

Eq. #31 gives an indication as to how to address the table 68, which is essentially a ROM unit which requires an address to perform its function. In the specific embodiment being described, the output of the table 68 is one bit per pixel, consequently, the output of table 68 is arranged to produce a black and white image with no gray levels in between. In this regard, $$P_{ij} = 1, \text{ if } g_{ij} \geqq T_1, \text{ otherwise} \quad \text{Eq. \#32}$$

$$P_{ij} = \phi, \text{ wherein } \phi < T_1 < K.$$

$T_1$ is a constant value such as $K - T_1 << T_1$. From experimental tests, it was found that if:

$$\phi < K - T_1 < 0.1K, \quad \text{Eq. \#33}$$

wherein $\phi$ is black and 1 is white, a large amount of background information such as the mountains 50 on the check 12 (FIG. 2) could be eliminated. In general, the function of the table 68 is to compare the center pixel 52 with the average sum (R from Eq. #25) of the pixels within the window 54, and if the center pixel is not sufficiently different from the average sum, it is a low frequency component and is made a binary "1" or "white"; if it is sufficiently different from the average sum, it is a high frequency component and is made a binary "$\phi$" or "black" in the embodiment being described.

As previously stated, the summing which is represented by the window 54 with regard to the center pixel 52 (FIG. 6) is done on a real time basis. Initially, it is necessary that 19 scans of pixels be obtained (in the embodiment being described) before the window 54 begins to function in scanning the pixels so that there is a correspondence between pixel data entering the high pass filter module 38 and pixel data entering the high pass filter module 38 and pixel data leaving the module, except for the lag of 19 scans. The scanner module 18 (FIG. 1) produces 19 scans for a border having a "white" pixel value to provide data for the right hand side of the digitized image (as viewed in FIG. 2) prior to the right edge 76 of the check 12 reaching the scanning line 20. This technique is expressed mathematically by stating that the digitized image is provided with a front border of T scan lines, with constant pixel values G. These T scan lines (19 in the embodiment being described) are loaded into the buffer memory 34. The T scan lines are numbered from $\phi$ to $T-1$, wherein:

$$b_{ij} = f_{ij} = G, \text{ and wherein} \quad \text{Eq. \#34}$$

$$\phi \leqq i \leqq T-1, \text{ and } \phi \leqq j \leqq N-1.$$

With regard to Eq. #34, i represents the scans along the X axis of FIG. 2, and j represents the position of pixels #$\phi$ through #639 along the Y axis. The sum of the pixels with the sum position j in the buffer memory 34 is obtained for each value of j and the result is then loaded into the scratch memory 64. This is expressed mathematically as follows:

$$S_j = \sum_{i=\phi}^{T-1} b_{ij} = TG, \quad \text{Eq. \#35}$$

wherein $\phi \leqq j \leqq N-1$; Eq. #35 corresponds to the definition of the scratch memory 64 expressed in Eq. #24. The first scan line $[f_{\phi j}]$ is the leading edge of the check 12 and it is then loaded into the next line T (after line $T-1$) of the buffer memory and the array S in the scratch memory 64 is updated according to:

$$S = S_j - b_{\phi j} + b_{Tj}, \text{ wherein } \phi \leqq j \leqq N-1. \quad \text{Eq. \#36}$$

The term $b_{100}$ represents the pixels of scan line #$\phi$, and $b_{Tj}$ represent the pixels of the new scan line T. This function is explained most easily with regard to FIG. 6. For example, using the scan numbers on FIG. 6, the scan T from the example being discussed is equivalent to scan 49 shown on FIG. 6 and $b_{\phi j}$ is equivalent to the pixel in row j which is derived from scan #30, and $b_{Tj}$ is equivalent to the pixel in row j which is derived from scan #49. The scratch sum for Row #0 is obtained by subtracting from the scratch sum for Row #0, the value for pixel $b_{\phi\phi}$ and adding to this scratch sum the value for pixel $b_{T\phi}$. The scratch sums for Rows #1 through #639 (for $\phi \leqq j \leqq N-1$) are then similarly updated.

The initial value of R which is the average value of the sum of pixel values within a window 54 (FIG. 6) and previously discussed in relation to Eq. #25 is calculated by the processor 60 as follows:

$$R = \sum_{j=\text{Mod}_N(\phi - r)}^{\text{Mod}_N(\phi + r)} S_j, \quad \text{Eq. \#37}$$

where, if $-N < x < 2N$, $$\text{Mod}_N(x) = \begin{cases} x \text{ if } \phi \leqq x < N, \\ x - N \text{ if } x \geqq N, \\ x + N \text{ if } \phi > x, \end{cases} \text{ and}$$

$$r = \frac{T-1}{2}.$$

The $\text{Mod}_N$ indicates a modulo-N counter in which the number represented reverts to zero in a sequence of counting after reaching a maximum value of $N-1$.

The value of the pixel $P_{\phi\phi}$ is then outputted from table 68 (FIG. 5) as follows:

$$P_{\phi\phi} = \text{TABLE}\ (R, b_{r+1\ \phi}) \quad \text{Eq. \#38}$$

The next output pixels are then computed by the processor 60 by sequentially updating R. For pixel n, $$R = R - S_a + S_b, \quad \text{Eq. \#39}$$

wherein:
$a = \text{Mod}_N(n-(r+1))$, and
$b = \text{Mod}_N(n+r)$.
The output of the table 68 then becomes:

$$P_{\phi n} = \text{TABLE}\ (R, b_{r+1}) \quad \text{Eq. \#40}$$

wherein: $n = 1, 2, \ldots N-1$.

The next scan line $[f_{ij}]$ coming from the scanner module 18 (FIG. 1) is loaded into the line T+1 of the buffer memory 34, the array S in the scratch memory 64 is updated and the output from table 68 $[P_{ij}]$ for the next or second scan line is computed by repeating the steps discussed. The next scan line [f2j] is then loaded into the line $\phi$ of the buffer memory 34, i.e., in generalized form, a scan line L is loaded into the line number of the buffer memory 34 given by the following expression:

$$Mod_{T+2}\,(T+L). \qquad \text{Eq. \#41}$$

For example, scan line number 3 is loaded into the buffer memory line=$\text{Mod}_{19+2}$ (19+3)=1. In general the buffer memory 34 may be considered as being arranged in an "endless drum" format, and the manipulations discussed in this paragraph relate thereto.

In general, when the scan line number L is loaded into the buffer memory according to Eq. #41, the scratch memory 64 (S) is updated as follows:

$$S_j = S_j - b_{qj} + b_{tj}, \qquad \text{Eq. \#42}$$

wherein $q = \text{Mod}_{T+2}$ (L); and $t = \text{Mod}_{T+2}$ (L+T).

The initial value for R for a new scan line is calculated as follows:

$$R = \sum_{j=\text{Mod}_N(\phi - r)}^{\text{Mod}_N(\phi + r)} S_j, \text{ and} \qquad \text{Eq. 43}$$

the first pixel of the output from table 68 corresponding to the scan line Q is equal to:

$$P_{L\phi} = \text{TABLE}\,(R, b_{m\phi}) \qquad \text{Eq. \#44}$$

wherein: $m = \text{Mod}_{T+2}$ (L+r+1)

The next pixel outputs from table 68 corresponding to scan line L are obtained by updating R. For pixel j:

$$R = R - S_a + S_b, \qquad \text{Eq. \#45}$$

wherein:

$a = \text{Mod}_N$ (j−(r+1)) and $b = \text{Mod}_N$ (j+r).

The pixel outputs from table 68 are then:

$$P_{Lj} = \text{TABLE}\,(R, b_{mj}) \qquad \text{Eq. \#46}$$

In the embodiment described, the window 54 contains 19×19 pixels as previously described. Because each pixel value has 6 bits, a 19×19 pixel value can be maintained as a 15 bit number; this value is implemented in the table 68 by truncating the 8 least significant bits of the 15 bit number and using only the 7 most significant bits thereof which are routed to the table 68.

A feature of this invention is that the computation time is not increased if the pixel value were increased from 6 bits to an increased number. Similarly, the computation time is not increased by increasing the size of the window 54 from 19×19 pixels to a larger amount; only the memory requirements would be increased correspondingly. Also, the window 54 could be changed in shape from the "square" shown to some other shape to suit a particular application; however, the mathematics involved would accordingly become more complicated.

FIGS. 9A through 9D when taken collectively as arranged in the layout shown in FIG. 10, show additional details of the high pass filter module 38 shown in FIG. 5. In general, some of the major elements of the module 38 include a sequencer 76 (FIG. 9B), an arithmetic logic unit (ALU) 78 (FIG. 9D), and a plurality of programmable read only memories (PROMS) which are numbered consecutively from #1 through #7. Basically, the sequencer 76 performs the function of sequencing the various addresses to the PROMS #1–#7 to provide the necessary microinstructions for effecting the various manipulations embraced by the various equations disclosed earlier herein. The PROMS #1–7 all function collectively as one large PROM; in the embodiment being described, these PROMS collectively function as one PROM with a 56 bit wide word collectively being outputted therefrom. Each one of the PROMS #1–#7 is directly addressed by the Y outputs from sequencer 76 via a 9 bit address which is routed over a 9 bit bus which is designated generally as 80. The sequencer 76 is a standard integrated circuit module such as #2910 which is manufactured by Advanced Micro Devices. The ALU 78 is comprised of four standard ALU's such as #2901, each of which is manufactured by Advanced Micro Devices. Each of these ALU's is a four bit slice ALU; however, they are conventionally cascaded together to form an ALU capable of handling a 16 bit word. The ALU 78 performs the additions and subtractions necessary for performing some of the steps indicated by some of the equations disclosed earlier herein; this aspect will be discussed in more detail hereinafter.

Figure 9A:
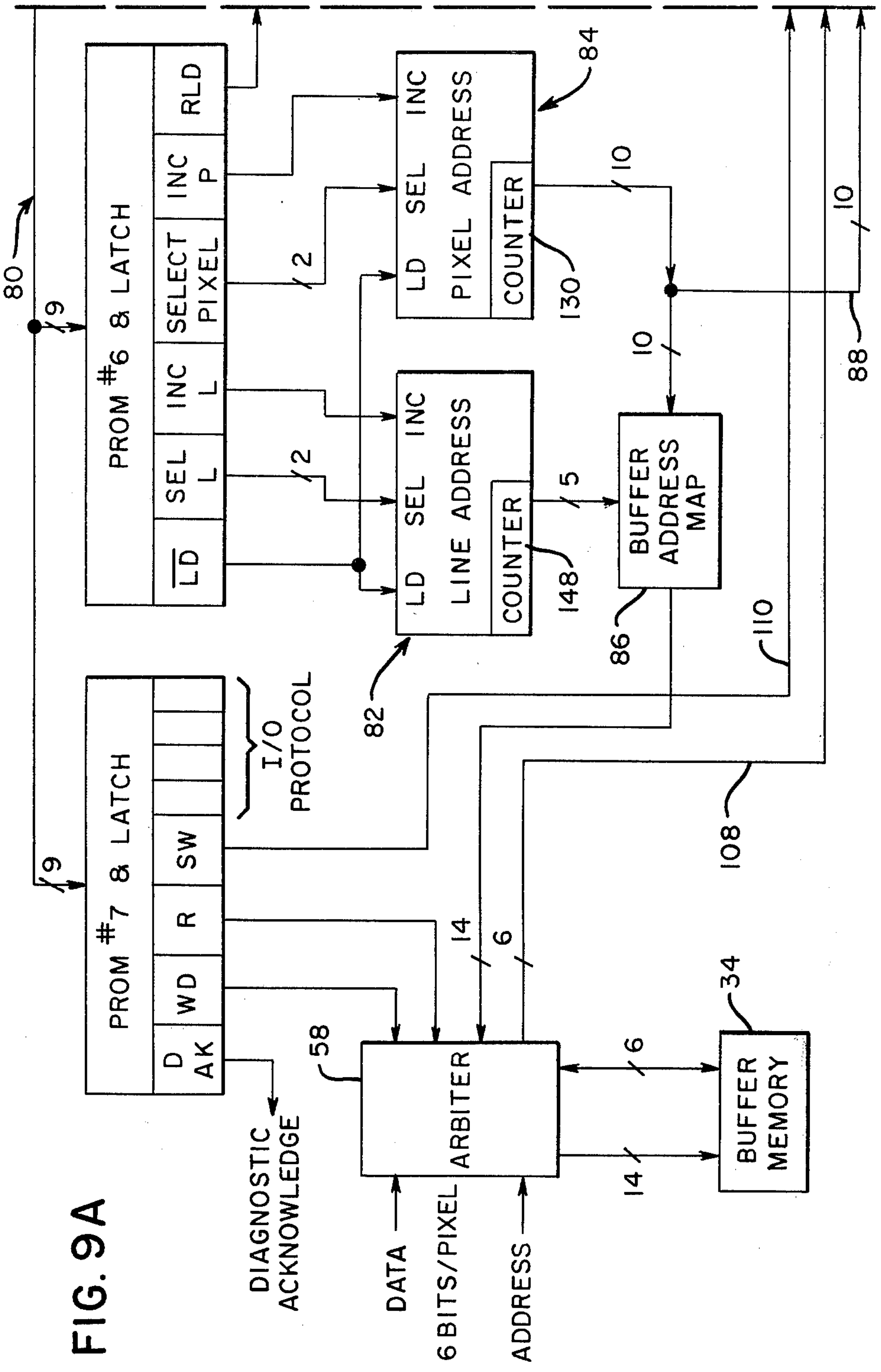
FIGS. 9A through 9D taken together, show additional details of the high pass filter module shown in FIG. 5.
Figure 9B:
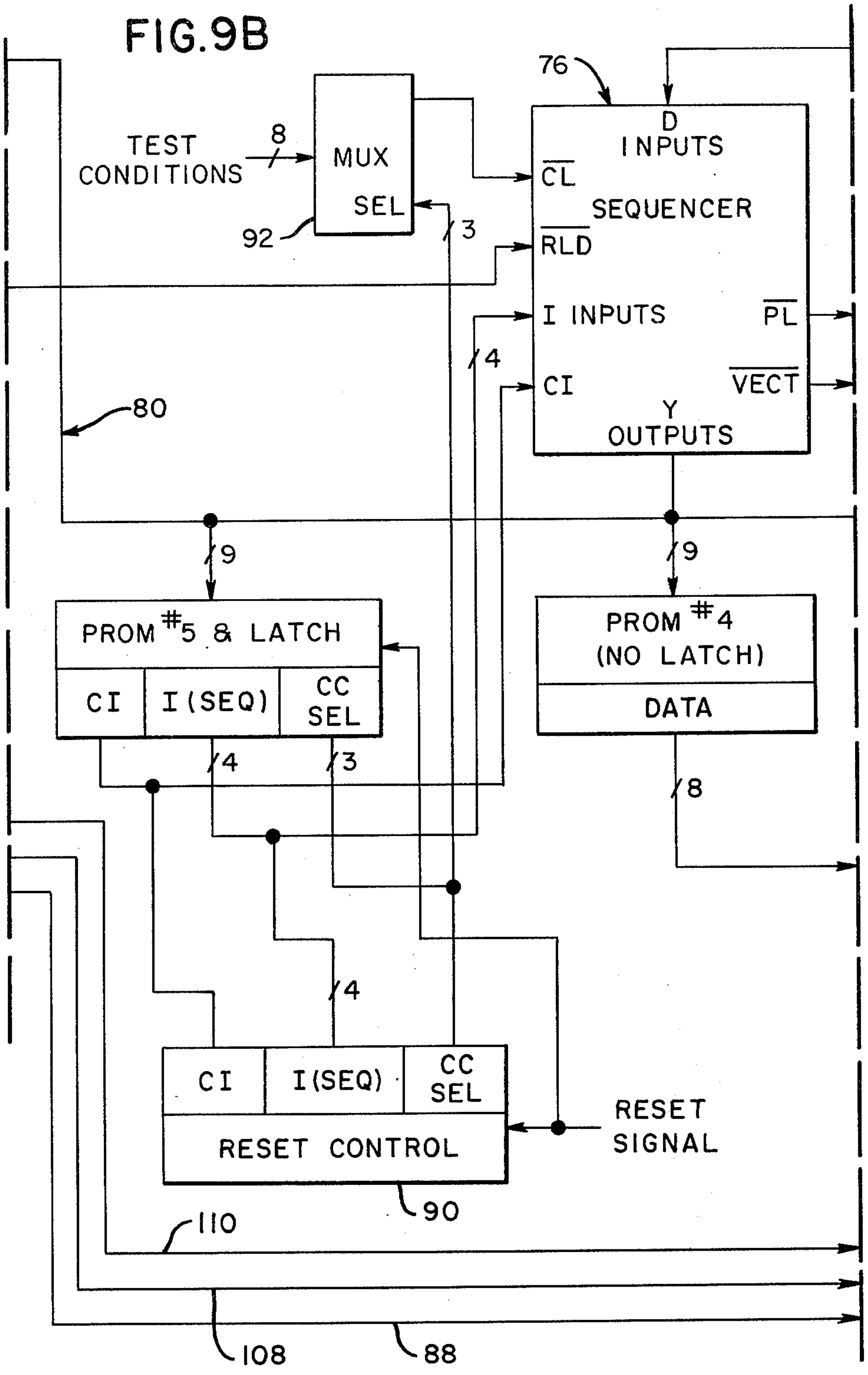
Figure 9C:
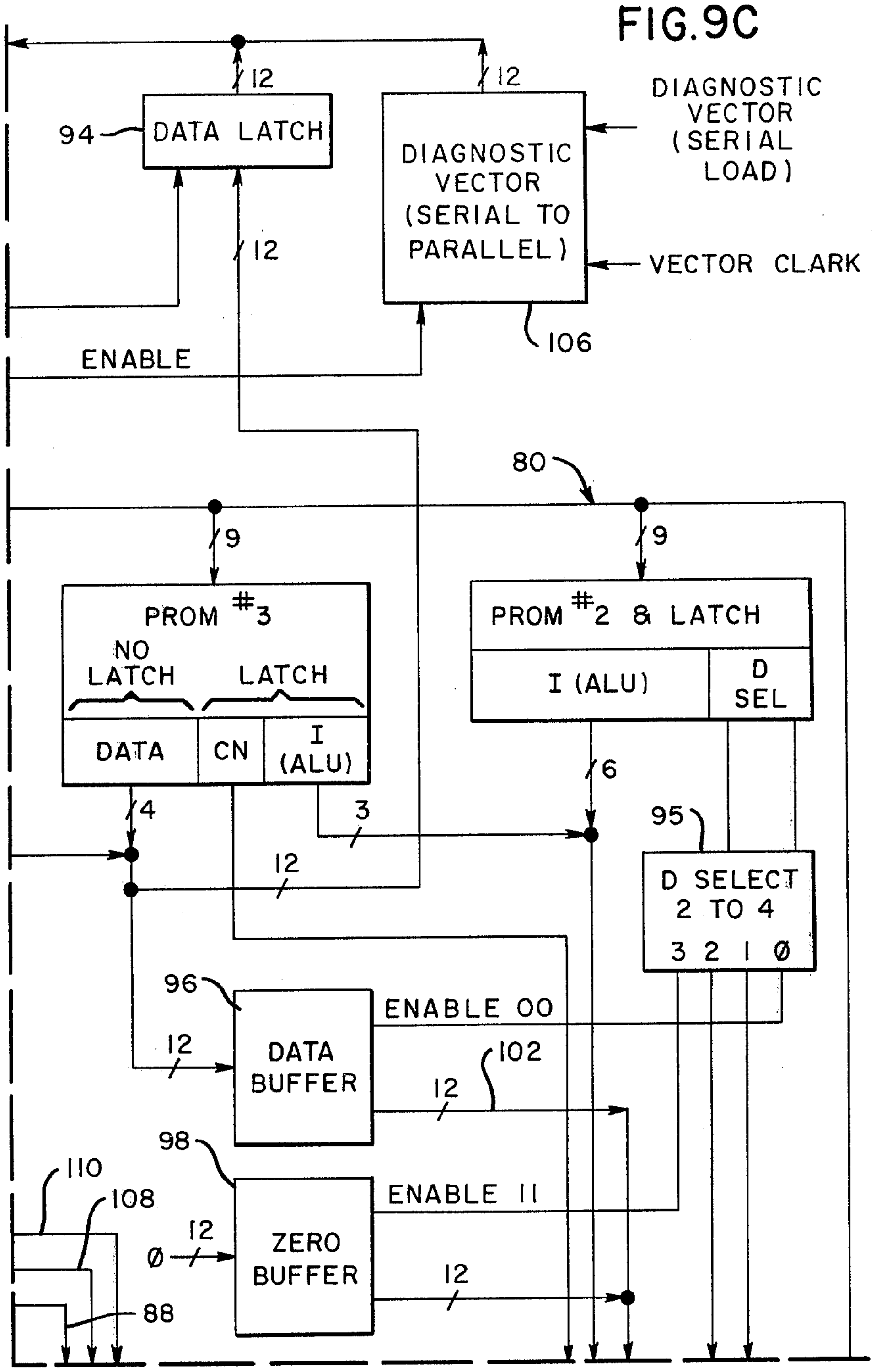

Each one of the PROM'S #1–#7 shown in FIGS. 9A–9D is a conventional integrated circuit module such as #82S114 which is manufactured by Signetics. The PROM's #1, 2, 5, 6, and 7 have conventional latches (not shown) associated therewith, PROM #4 has no latch associated therewith, and PROM #3 (FIG. 9C) has no latch associated with half its outputs and a latch associated with the remaining half as shown in FIG. 9C; these latches are conventional integrated circuits such as #74S374 which are manufactured by Texas Instruments.

Figure 9D:
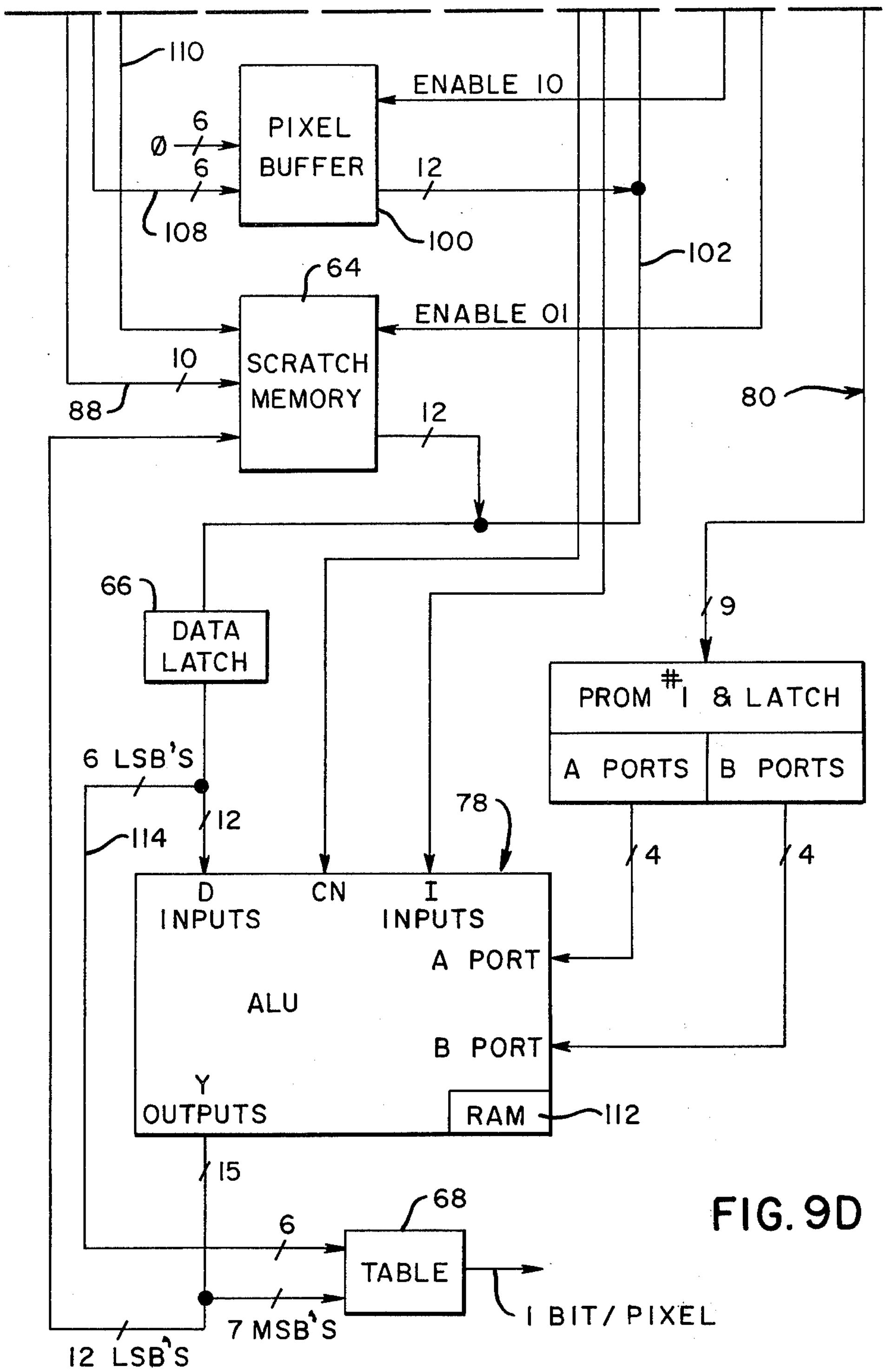

The functions of each of the PROM's #1–#7 will now be discussed in detail. The processor 60 in FIG. 5 basically includes the sequencer 76, the ALU 78, and the various PROM's #1–#7. PROM #7 (FIG. 9A) provides the external control of the processor 60. If the entire processor 60 is in a diagnostic mode, as initiated by the diagnostic vector module 80 (FIG. 9C), a diagnostic acknowledge signal (D-AK) will be generated by PROM #7; because this aspect is not important to or a part of this invention, it need not be described in any further detail. The PROM #7 also has a plurality of ports marked I/O Protocol; these ports are merely indicators which indicate that data is present at the output of table 68 (FIG. 9D) for use by the noise cleaner module 40 (FIG. 1) in the embodiment being described. The usual handshaking functions are also performed by the PROM #7. As part of the execution sequence controlled by the sequencer 76 (FIG. 9B), the WD port of PROM #7 is used to disable data from being written into the buffer memory 34 by the enhancement module 36 via the arbiter 58, and the R port of PROM #7 is used to read data from the buffer memory 34. The SW port of PROM #7 is used to write data in the scratch memory 64 (FIG. 9D).

PROM #6 (FIG. 9A) is the control PROM for generating the required buffer memory addresses and pixel addresses and includes indicators or selectors and incrementers to keep track of the various addresses required by the processor 60. The two ports marked SEL.L from PROM #6 are used to select a line address in the line address module 82, and similarly, the two ports marked SELECT PIXEL are used to select a pixel address in the pixel address module 84. With regard to FIGS. 9A–9D, the numerals such as 12, 19, and 18 which appear on certain lines for example, are used to indicate the number of data lines going to and coming from the various elements shown therein. The ports marked INC.L and INC.P for PROM #6 are the ports for incrementing the modules 82 and 84, respectively. The outputs of the line address module 82 and the pixel address module 84 are combined in the buffer address map module 86 whose output is fed into the arbiter 58. The appropriate WD and R control signals coming from the associated ports of PROM #7 are also presented to the arbiter 58 along with the 14 bit address coming from the buffer address map module 86. The output of the pixel address logic module 84 (10 bits) is also presented to the scratch memory 64 over the bus 88. The functioning of the modules 82, 84, and 86 will be described in more detail hereinafter.

PROM #5 (FIG. 9B) provides the control inputs to the sequencer 76. The four I (Seq) output ports of PROM #5 (connected to the I inputs of the sequencer 76) are uesed to increment the sequencer 76 to the next address or to provide a jump instruction to the sequencer; these I(Seq) output ports are also connected to the I(Seq) output ports of the reset control module 90 (FIG. 9B). Three CC select output ports (CC Sel) from the PROM #5 are connected to the similar inputs to the reset control module 90 and the select ports of a multiplexer 92; these select ports provide the function of selecting the proper condition code as an input to the sequencer 76. The CI output from PROM #5 is connected to the similar output of the reset control module 90 and (to the input of) the sequencer 76; the CI output performs the function of determining the next address generated by the sequencer 76. Upon being reset, the reset control module 90 forces the sequencer 76 to address PROM location $\phi$.

PROM #4 (FIG. 9B) and PROM #3 (FIG. 9C) provide the jump addresses for the sequencer 76 itself. Eight bits of data from the output ports of the PROM #4 and 4 bits of data from the output ports of PROM #3 are combined in a 12 bit bus and are fed into the data latch 94 and the data buffer 96 (FIG. 9C), and the 12 bit output from the data latch 94 is fed into the D inputs to the sequencer 76. When a sequence of instructions comes to an end and there is another sequence of instructions to be executed, the appropriate data therefor will be provided by PROM's #3 and #4 and presented to the data latch 94; and the jump will be executed in the next instruction.

The three output ports marked I (ALU) from the PROM #3 and the six similar outputs from the PROM #2 (FIG. 9C) are combined into a 9 bit bus and fed into the I inputs of the ALU 78 (FIG. 9D); these outputs merely provide the instructions to the ALU 78 for such functions as adding, subtracting, holding, or outputting data. The CN output from PROM #3 is connected to the CN input of the ALU 78. The two output ports marked D SEL of PROM #2 are used to select the data going to the data latch 66 (FIG. 9D); these two output ports D SEL are fed into a conventional 2 to 4 select module 95. The module 95 is used to select one of the data buffer 96, zero buffer 98, pixel buffer 100 (FIG. 9D), and scratch memory 64 for outputting the selected data onto the data bus 102 which is fed into the data latch 66; for example, the output marked $\phi$ on the select module 95 will enable the data buffer 96 to output its data on to the data bus 102. The enable line for data buffer 96 is marked "00"; the 00 refers to the two inputs to the select module 95.

PROM #1 (FIG. 9D) is utilized to provide the addresses for a RAM 112 which is inherent in the ALU 78. Four output ports marked A and four output ports marked B from PROM #1 are fed into the corresponding A and B ports of ALU 78.

In order to insure proper operation of the high pass filter module 38 (FIGS. 9A–9D), a diagnostic vector module 106 (FIG. 9C) is provided. This module 106 is utilized to provide a diagnostic sequence for checking on the operation of the processor 60 (essentially the sequencer 76, PROM's #1–7, and the ALU 78) to insure the proper operation thereof. Because the functioning of the diagnostic vector module 106 may be conventional, and because a knowledge of its operation is not necessary for an understanding of the high pass filter module 38, it need not be described in any further detail.

The operation of the scratch memory 64 (FIG. 9D) with regard to the calculation of some of the pixels in the window 54 (FIG. 6) will now be discussed in relation to FIGS. 9A–9D.

The scratch memory 64 (FIG. 9D) is initialized (or made to contain zeros) before any pixel data is entered therein. The initialization is accomplished by utilizing PROM #4 (FIG. 9B) and PROM #3 (FIG. 9C) to present 0 data over bus 102 to the data latch 66 (FIG. 9D); this $\phi$ data is then outputted by the ALU to all the scratch sums for Rows #0 through #639 (as viewed in FIG. 6) thus making them equal to zero. The next step is to gather the pixel data as it comes from the buffer memory 34 (FIG. 9A).

It should be recalled that the data in the scratch memory 64 (FIG. 9D) is kept in scratch sums for 19 pixels as already discussed in relation to FIG. 6. The very first pixel which is obtained from the scan marked #0 in FIG. 6 is routed from the buffer memory 34 (FIG. 9A) via the arbiter 58 over the bus 108 to the pixel buffer 100 (FIG. 9D) and to the data latch 66 (FIG. 9D). The first pixel data in latch 66 is then presented to the ALU 78 (FIG. 9D) where the value of the first pixel is added to the value for the scratch sum for Row #0 which at this time is zero. The resulting output (Y outputs) from the ALU 78 is then routed to the scratch memory 64 where this updated scratch sum for Row #0 is entered at the address controlled by the pixel address logic 84 (FIG. 9A) via bus 88 and the scratch write (SW) output from PROM #7 and bus 110. At this point in time, the scratch memory 64 contains the pixel value (in the scratch sum for Row #0) for the very first pixel. The second pixel from scan #0, in the example being described, is then presented to the data latch 66 as previously described, and the value of the second pixel is added to the scratch sum for Row #1 (as shown in FIG. 6) via the ALU 78, and this value is stored in the scratch memory 64 for Row #1. This process is repeated through the 640th pixel from the first scan #0, and the value for this 640th pixel is stored in Row #639 in the scratch memory #64. The process just described is repeated through scan #18 so that the scratch memory 64 now contains scratch sums for 19 pixels for Rows #0 through #639 as shown diagrammatically in FIG. 6. At this point, no data as yet has been outputted from the table 68 (FIG. 9D); however, the sequencer 76 is prepared to output data. The sequencer 76 then controls the ALU 78 to add the scratch sums within the window 54. This is accomplished by a very short sequence which cycles the scratch sums for Rows #631 through #639 and Rows #0 through #9 resulting from scans #0 through #18 (in the example being described) from the scratch memory 64 through the data latch 66 to the ALU 78, and the sum of these 19 scratch sums is stored in a RAM 112 associated with the ALU 78. The RAM 112 at this time contains a 15 bit sum which represents the sum of the pixels within the window 54; the 7 most significant bits of this sum are then presented to the table 68. The sequence of instructions generated by the sequencer 76 causes PROM #6 to control the pixel address module 84 and the line address module 82 so as to generate the correct address on the output of the buffer address map 86 which is routed to the arbiter 58. Simultaneously, PROM #7 via its WD and R outputs controls the arbiter 58 so as to read the center pixel 52 for a window 54 from the buffer memory 34. The value for this center pixel is outputted over bus 108 and pixel buffer 100 to the data latch 66. The value in latch 66 is then presented to the table 68 over bus 114. The value of the seven most significant bits of the window sum and the value of the center pixel are then decoded by the table 68 to produce the one bit per pixel output therefrom as previously explained.

The sequencer 76 and the I/O protocol bits of PROM #7 are used to indicate when valid data is present at the output of table 68 to be transferred to the noise cleaner module 40 (FIG. 1) as previously described.

The next step in the process being described is to "move" the window 54 down one row as viewed in FIG. 6. At this point it should be pointed out that the first several scans as viewed in FIG. 6 contain "white" border or background information, and similarly, the associated scratch sums also contain "white" background information so that real data with regard to the check 12 (FIG. 2) is not lost by using the first center pixel in a window which contains the scratch sums for Rows #631 through #639 and Rows #0 through #9 for scans #0 through #18. This center pixel is located in Row #0 and Scan #9. This aspect will be more readily understood in connection with FIGS. 11A–11E which will be described hereinafter. Continuing with this example, the next step is to move the window 54 down one row and to calculate the values of the pixels embraced by the newly-moved window 54. This is accomplished by the sequencer 76 which directs the scratch memory 64 (as addressed by the pixel address module 84) to output the scratch sum for Row #631 to the data latch 66. The ALU 78 when subtracts the scratch sum of Row #631 from the sum of the values of the pixels in the previous window 54 which is stored in the RAM 112, and thereafter, the scratch sum for Row #10 is presented to the data latch and added to the sum in RAM 112. This updated sum for the new window 54 is outputted to the table 68 as previously described and the value for the center pixel of the new window (which is located in Row #1 and Scan #19) is obtained as previously described and is also presented to the table 68 which decodes the data presented thereat and outputs 1 bit/pixel for the second pixel under consideration. After the scratch sum of Row #639 is used, the scratch sum of Row #0 is used for the next repetition. The process described is repeated until the window 54 is moved downwardly (as viewed in FIG. 6) and the sum of the pixel values within the window are compared with the central pixel from Row #639. At this time, the window 54 must be moved to the top of FIG. 6 and it must also be moved along the X direction (as viewed in FIG. 6) to pick up the pixel values for Scan #19 and drop off the values for the pixels resulting from Scan #φ. The sequencer 76 accomplishes this by subtracting the pixel value for Scan #φ from the scratch sum for Row #φ and adding the pixel value for Scan #19 for this row to the scratch sum for Row #φ which is then placed back into the scratch memory 64 via the techniques already described. This process is repeated for the scratch sums for Rows #1 through #639, and thereafter the window 54 is moved "downwardly" as previously described to generate the sums of the values of the pixels within the window 54 and to provide the outputs from table 68. This process is repeated for the length of the check 12 along the X direction as viewed in FIG. 2.

While the various sums of the window 54 are being calculated as described, it is possible that an error may be introduced into the calculations because of communication or "handshaking" operations external to the high pass filter module 38. To avoid the introduction of such errors, the zero buffer 98 (FIG. 9C) is utilized. The zero buffer 98 merely presents zero data to the data latch 66 (FIG. 9D) in the right sequence so that when an addition or subtraction is performed out of sequence or because of incorrect "handshaking", zero is the argument for the addition or subtraction performed by the ALU 78, and consequently, none of the mathematical operations performed by the ALU 78 is in error.

Figure 11A:
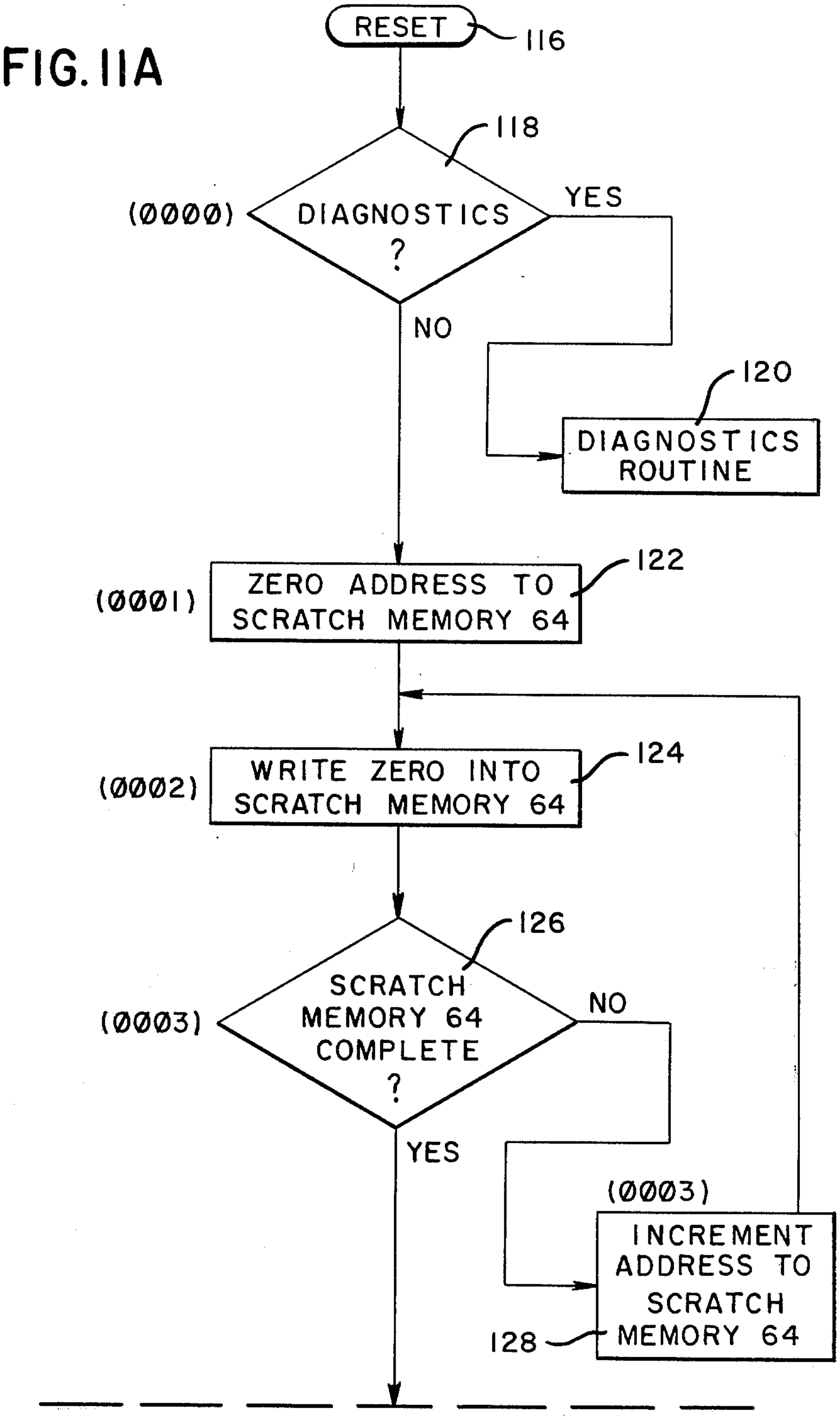
FIGS. 11A through 11E when arranged as shown in FIG. 11F show a flow-chart explaining the operation of a preferred embodiment of the high-pass filter module shown in FIGS. 9A through 9D.
Figure 11B:
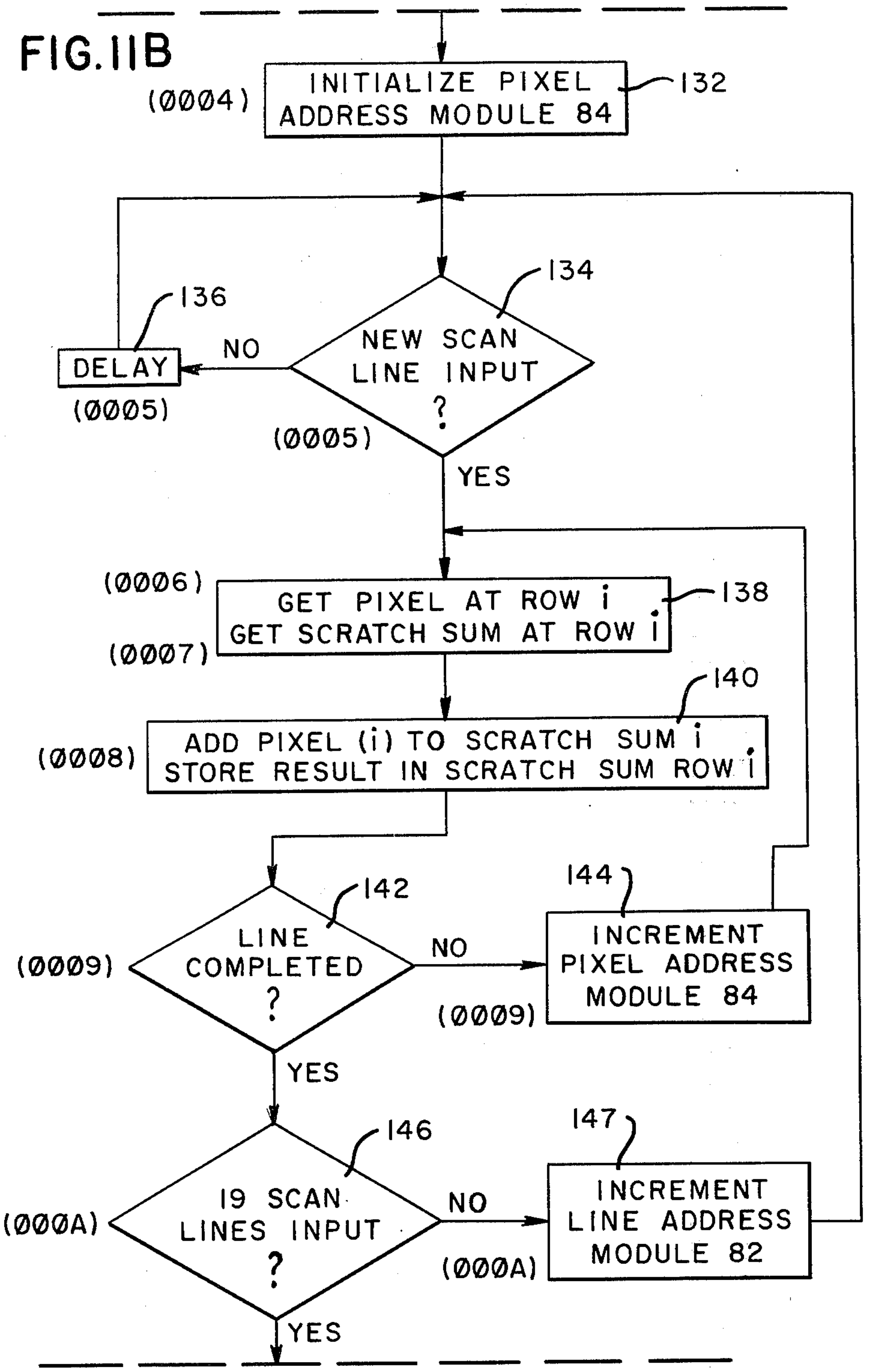
Figure 11C:
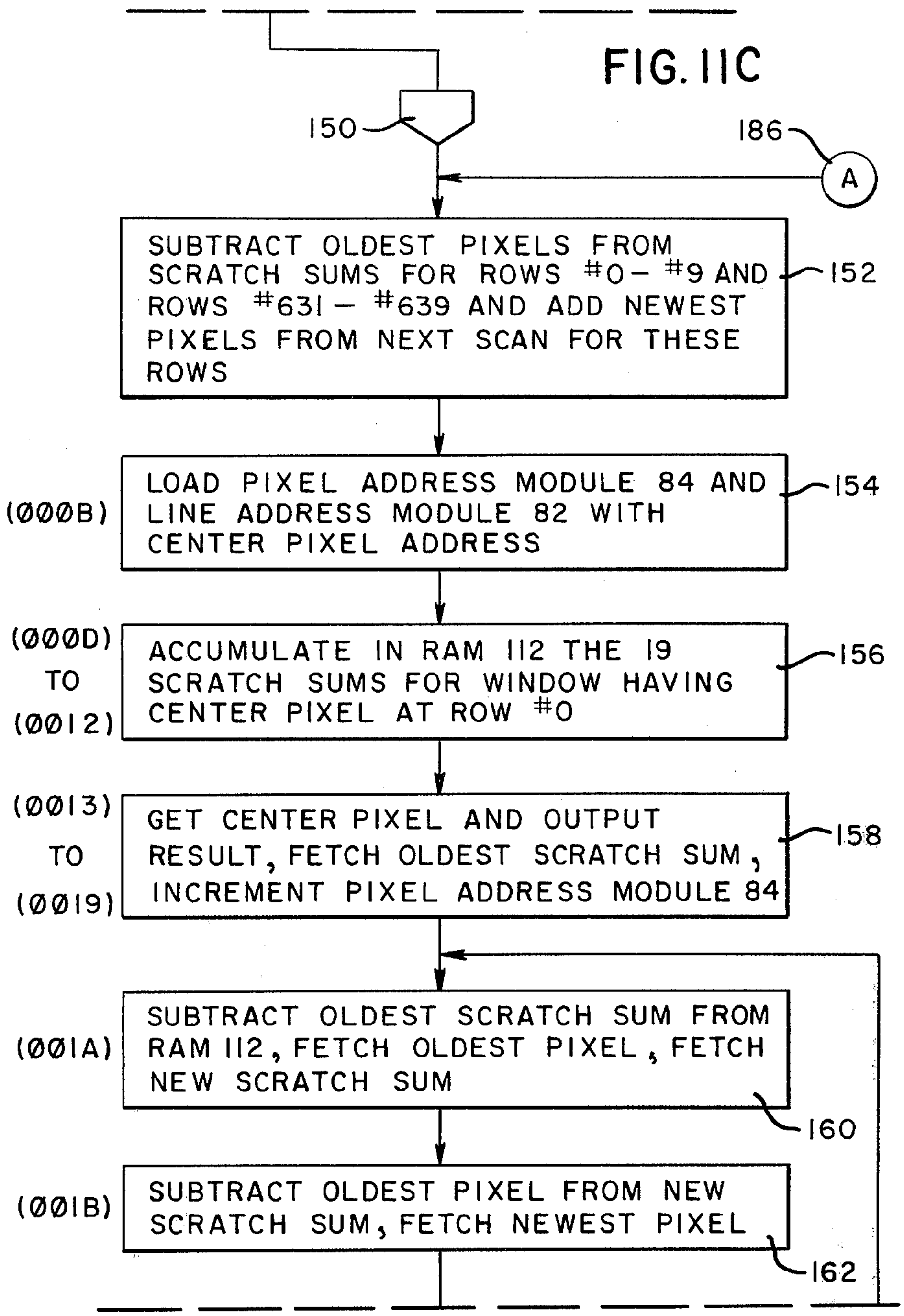
Figure 11D:
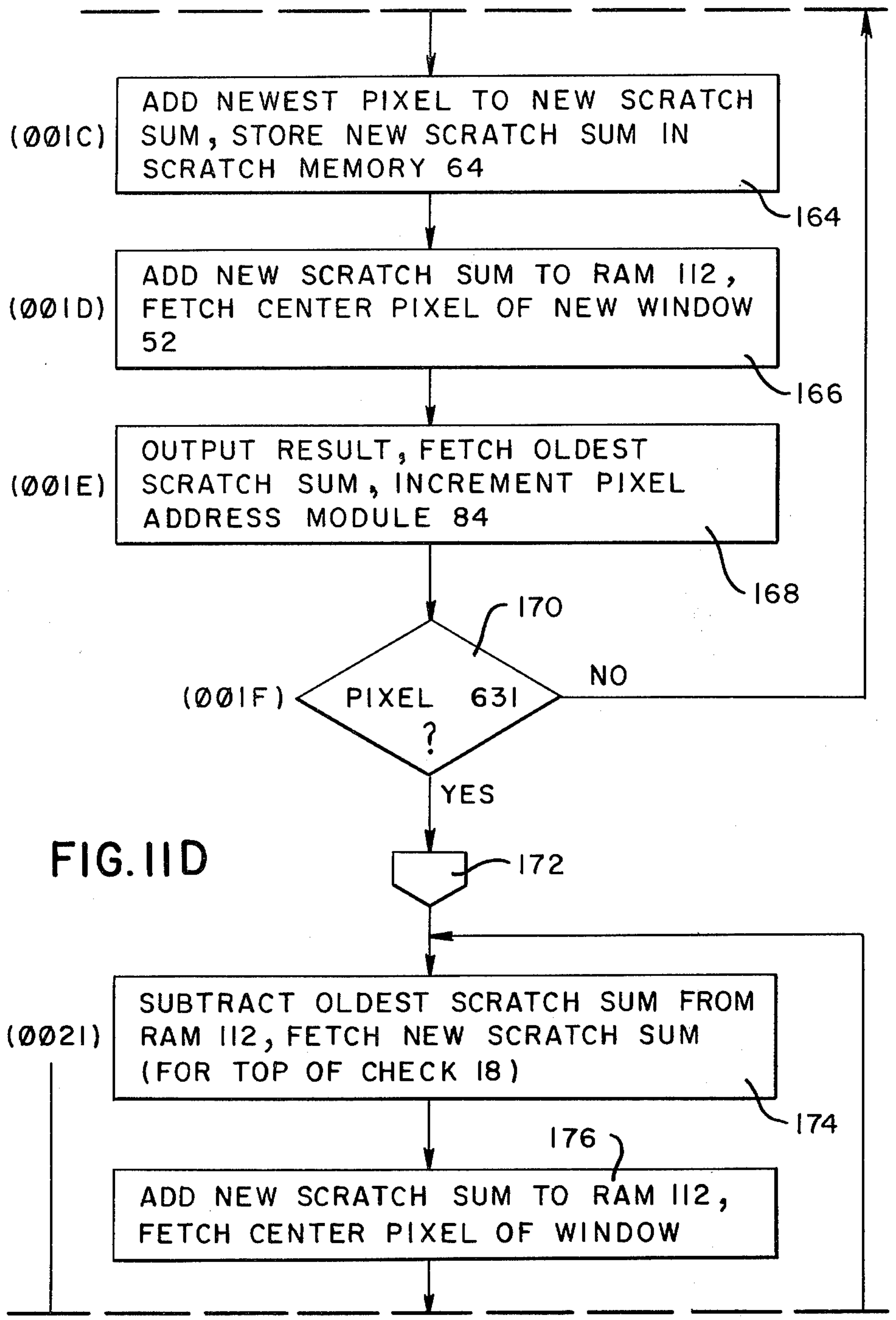
Figure 11E:
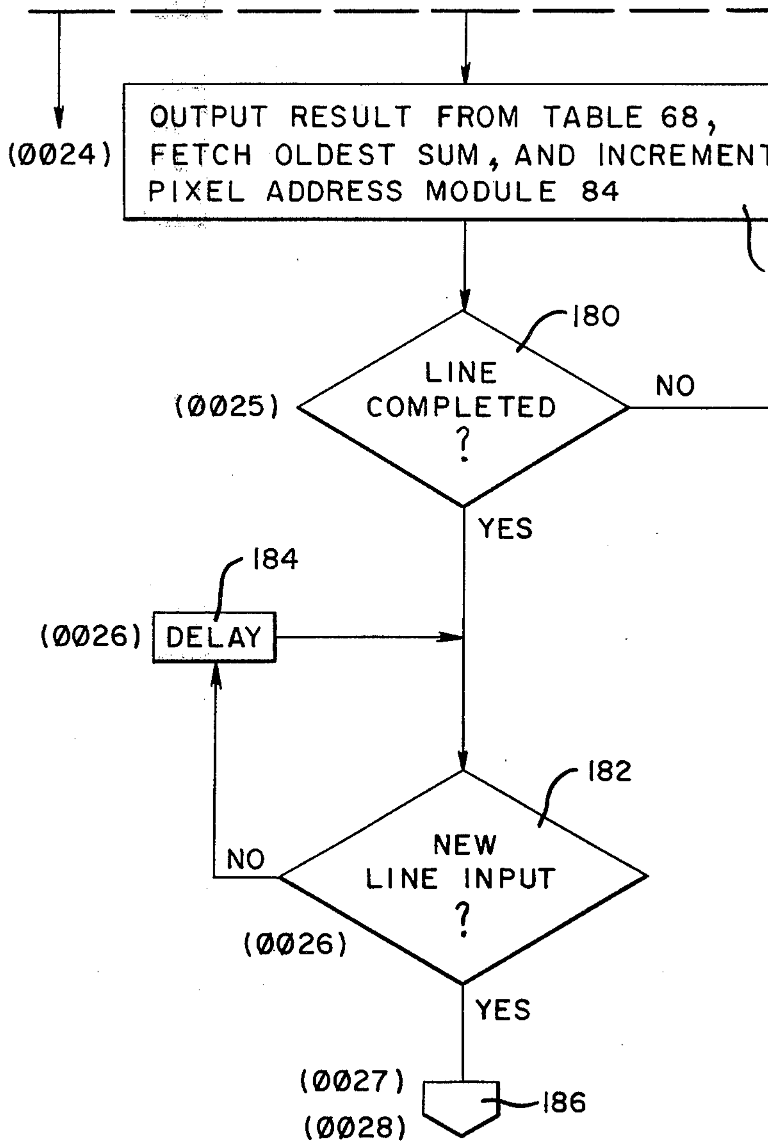
Figure 11F:
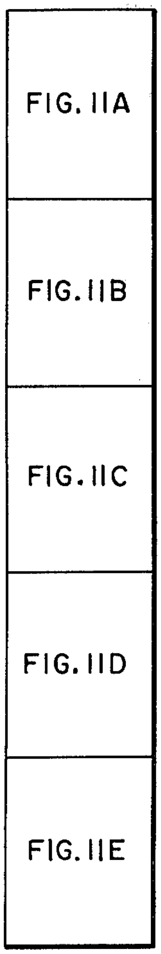

FIGS. 11A through 11E, when arranged as shown in FIG. 11F, show a flow-chart explaining the operation of a preferred embodiment of the high-pass filter module 38 shown in FIGS. 9A through 9D.

The module 38 is reset in step 116 (FIG. 11A) by a reset signal being fed into the reset control module 90 (FIG. 9B) and the PROM #5. The effect of the reset signal is to reset the sequencer 76 to location zero for all the PROMS #1–#7; this is the initial state or beginning for the processor or ALU 78 (FIG. 9D). When the reset signal is removed, the ALU 78 proceeds to step 118 at which a diagnostic routine 120 may be implemented on the module 38 by the diagnostic vector module 106 shown in FIG. 9C; because this aspect is not important to this invention, it need not be described in any further detail.

Assuming that no diagnostic routine is called for, the next step 122 (FIG. 11A) in the operation of the high pass filter module 38 is to zero the address to the scratch memory 64 (FIG. 9D). Step 122 is effected by having the sequencer 76 output a signal to the PROM #6, and this PROM (FIG. 9A) loads a zero address in the line address module 82 and also loads a zero address in the pixel address module 84. After step 122 is completed, zeros are written into the scratch memory 64 at step 124 for the initial address from step 122. Step 124 is executed by having the sequencer 76 control the PROMS #4 and #3 to output zero data into the data buffer 96 (FIG. 9D) which data is subsequently latched into the data latch 66 and loaded into the scratch memory 64 via the ALU 78. In the example being given, zero data is loaded into the scratch sum for Row #0 in the scratch memory 64 as previously explained, and since there are 640 scratch sums for Rows #ϕ through Row #639 (FIG. 6), the scratch memory 64 is not completely zeroized at this point in time (as indicated by step 126), and therefore, a loop including steps 124, 126 and 128 is entered into. Step 126 is essentially a comparison step which compares the present address in the pixel address module 84 with the maximum number of 639 in the example being given. In step 128, the sequencer 76 causes PROM #6 to increment the pixel address module 84 via the INCP port on PROM #6; the module 84 has a counter 130 associated therewith for this purpose. The next pixel address in the example being given relates to the scratch sum for Row #1 and this address is routed over bus 88 to the scratch memory 64 (FIG. 9D) and at step 124, zero data is written into scratch memory 64 for Row #1 as previously explained. The loop containing steps 124, 126, and 128 is repeated until the comparison step 126 indicates that the scratch sum (zero) for Row #639 has been written into the scratch memory 64. At step 132, the pixel address module 84 is again initialized to zero as was done in step 122, and the high pass filter module 38 is ready to receive a scan line of pixels from the edge enhancement module 36 (FIG. 1) as previously described.

If no new scan line of pixels is received in the buffer memory 34 at step 134 in FIG. 11A, the ALU 78 merely waits as shown by the delay step 136. The delay shown by step 136 is inherent in the cycle time of the ALU 78. When a new scan line of pixels is received by the buffer memory 34, step 138 is initiated. At step 138, the first pixel, in the example being described, is Pixel #ϕ from the first scan line #ϕ (FIG. 6); it is fed over bus 108 to the pixel buffer 100 (FIG. 9D). Simultaneously, the scratch memory 64 is addressed for Row #ϕ via bus 88 and the ALU 78 adds the pixel #ϕ (in step 140) to the scratch sum for Row #ϕ and stores the result in the scratch memory 64 for Row #ϕ as previously described. At step 142, a decision is made as to whether the scan line is complete, i.e. "Have pixels #ϕ through #639 been added to the associated scratch sums?" If "no", the pixel address module 84 is incremented in step 144 and steps 138, 140, 142 and 144 are repeated for all the remaining pixels in the first scan line #ϕ. When the scan line #0 is completed at step 142, a decision is made at step 146 as to whether or not 19 scan lines of pixels (from Scans #ϕ through #18) have been inputted. If they have not, the line address module 82 (FIG. 9A) at step 147 is incremented by one (via the INC L port on PROM #6) and steps 138, 140, 142, 144 are repeated for the first 19 scan lines; a counter 148, associated with the module 82 is utilized in the counting of the scan lines. The first 19 scan lines which have been entered represent the white border information which is introduced into the high pass filter module 38 before the first data about the check 12 itself is introduced as previously stated. When the first 19 scan lines have been inputted (at step 146), the yes path is executed as at step 150 in FIG. 11C.

Following step 150 (FIG. 11C), the ALU 78 updates the scratch sums for Rows #ϕ through Row #9, and Rows #631 through #639 in step 152 by, for example, subtracting the pixel #ϕ in Row #ϕ (the oldest pixel) from Scan #0 and adding in the pixel #ϕ in Row #ϕ from Scan #19 (the newest pixel) in the example being discussed. The same is done for the scratch sums associated with Rows #1 through #9 and Rows #631 through #639. The window 54 (like in FIG. 6) now contains the scratch sums for rows #ϕ through #9 and Rows #631 through #639 and the window contains pixels resulting from Scan #19 which represents actual data coming from the first scan which actually scans the right-most or leading edge of the front of the check 12 as viewed in FIG. 1. It should be recalled that earlier herein, it was stated that the last few rows of pixel data, resulting from the lower border of the check 12, are used in developing a window 54 for a pixel appearing at Row #ϕ or the top border of the check.

Following step 152, the pixel address module 84 and the line address module 82 are initialized at step 154 with a predetermined value or address (via PROM #6 in FIG. 9A) that represents the center pixel for "Row #ϕ" for the middle of the white border which precedes the actual data on the check 12; this center pixel is derived from Scan #9 of the 19 Scans from Scan #ϕ through Scan #18 for the white border. At step 156, the scratch sums for Rows #631–#639 and Rows #ϕ–#9 are outputted from the scratch memory 64 (FIG. 9D) through the data latch 66 to the ALU 78 where these scratch sums are added and stored as a window 54 sum in the RAM 112. In other words, the RAM 112 contains the total value of 19×19 pixels in a window 54, with the center pixel of the window being located at Row #ϕ, resulting from Scan #9 i.e., the center scan of the white border mentioned. After step 156 (FIG. 11C) is completed, the center pixel, which in the example being described, is the pixel in Row #ϕ from Scan #9, is obtained in step 158 and presented to the table 68 (FIG. 9D) via the data latch 66, and the seven most significant bits of the total value of the 19×19 pixels in the window 54 being discussed are also presented to the table 68 via the ALU 78; the table 68 decodes these inputs thereto and outputs one bit/pixel as previously explained. Thereafter the oldest scratch sum (for Row #631) is obtained and the pixel address is incremented (via the pixel address module 84). This means that the next window 54 will be located around the center pixel which is located in Row #1 and results from Scan #9 in the example being described.

At step 160 (FIG. 11C) the oldest scratch sum (for Row #631) is subtracted from the 19×19 total of the window 54 in the RAM 112, the oldest pixel is obtained from the buffer memory 34, i.e.; the pixel in ROW #10 resulting from Scan #ϕ, and the next scratch sum (for Row #10) is obtained.

At step 162, (FIG. 11C) the oldest pixel from Row #10 and Scan #ϕ is subtracted from the new scratch sum for Row #10, and the newest pixel (for Row #10 derived from Scan #19) is obtained.

At step 164 (FIG. 11D), the newest pixel (for Row #10 derived from Scan #19) is added to the newest scratch sum (for Row #10) and this new sum is stored in the scratch memory 64. This is accomplished via the sequencer 76 (FIG. 9B) instructing the PROM #7 which in turn generates the appropriate WD and R signals to the arbiter 58 (FIG. 9A), and subsequently, the buffer memory 34 generates the required new pixel. The address for the arbiter 58 at this point is supplied by the buffer address map module 86. The scratch sum for Row 10 is now updated for use in the next window 54 which is to be centered about the next center pixel which is located at Row #1 and derived from scan #9.

At step 166 (FIG. 11D) the new scratch sum (for Row #10) is added to the sum in the RAM 112 in the ALU 78 to complete or update the new window 54. The center pixel located at Row #1 and derived from Scan #9 is then fetched via the pixel address module 84 from the buffer memory 34 (FIG. 9A) and routed via the pixel buffer 100 (FIG. 9D) to the data latch 66 where it will be used by the table 68 to produce the next output of one bit/pixel in conjunction with the associated window sum contained in the RAM 112 as previously described.

At step 168 (FIG. 11D), the table 68 outputs the one bit/pixel for the associated central pixel of the previous paragraph, and preparation is begun for recycling if required; ie, the oldest scratch sum (now for Row #632 in the example being described) is obtained to move the window 54 so that it is centered about the next pixel which is located in Row #2 and derived from scan #9. The pixel address module 84 is then incremented via the PROM #6 as previously explained.

At step 170 (FIG. 11D) if pixel #631 is not reached, the steps 160–168 are repeated until the pixel #631 is reached, ie, the first 630 pixels resulting from a scan such as Scan #9 are covered by steps 160–168 and the pixels #631 through #639 for a scan are covered in another routine shown beginning at starting point 172 shown on FIG. 11D. The reason for this added routine beginning at point 172 is that it is not necessary to update the scratch sums for Rows #631 through #639 because these sums were already updated (in step 152 in FIG. 11C) as far as deleting the oldest pixel and adding the newest pixel is concerned.

From point 172 in FIG. 11D, the next step 174 is to subtract the oldest scratch sum (for Row #622) from the 19×19 total or window 54 stored in the RAM 112 and fetch the next new scratch sum (for Row #0 for the top of the Check 18). Thereafter, in steps 176 the new scratch sum (for Row #φ is added to the window sum stored in the RAM 112, and the center pixel (Row #631 from Scan #9) of the associated window is fed into the data latch 66 as previously explained. In step 178, the center pixel and the associated 19×19 window sum stored in the RAM 112 are fed into the table 68 as previously explained and the 1 bit per pixel is outputted therefrom.

Steps 174, 176 (FIG. 11D) and 178 shown in FIG. 11E are repeated 9 times for Rows #631 through #639, and when completed at step 180, a decision is made at step 182 as to whether a new scan line of input has been fed into the buffer memory 34 (FIG. 9A) from the edge enhancement module 36 (FIG. 1). If there is no new line of input, a delay 184 (FIG. 11E) of one clock cycle is introduced whereby the ALU 78 waits until a new scan line is introduced, whereupon the routine being described proceeds to point 186 (FIG. 11E) which is shown on FIG. 11C just above step 152 to repeat the process described until all scan lines for a check 12 have been completed by the scanner module 18 (FIG. 1).

Some additional comments with regard to the pixel address logic module 84, the line address module 82, and the buffer address map module 86 shown in FIG. 9A seem appropriate. The pixel address module 84 contains the address of a center pixel as measured in the Y direction (FIG. 6), and this module contains the counter 130 which counts modulo 640 for the locations in the Y direction. The counter 130 tracks the center pixel within the buffer memory 34. The line address module 82 contains the counter 148 which counts the scan lines in the X direction (FIG. 6), and this module 82 counts modulo 21. When the window 54 moves in the Y direction (FIG. 6), the INC. P Port of PROM #6 becomes active and when the window 54 moves in the X direction (FIG. 6), the INC. L Port of PROM #6 becomes active.

The pixel address module 84 (FIG. 9A) generates the row address (in a Y direction as previously explained) required for addressing a pixel or a scratch sum relative to the associated center pixel. For a generic center pixel which is located in Row i, wherein $\phi \leq i \leq 639$, the module 84 can selectively generate one of three pertinent addresses $P_1$, $P_2$, or $P_3$, wherein:

$P_1 = Mod_{640}(i-10)$, $P_2 = i$, and $P_3 = Mod_{640}(i+9)$

By using the SELECT PIXEL port of PROM #6, the above $P_1$, $P_2$, and $P_3$ addresses are selected as follows:

| SELECT PIXEL | Address Output |
|---|---|
| 00 | $P_2$ |
| 01 | $P_3$ |
| 10 | $P_2$ |
| 11 | $P_1$ |

The line address module 82 (FIG. 9A) generates the scan line number (in the X direction as reviewed in FIG. 6) for addressing a pixel relative to a center pixel. For a window 54, centered at a generic scan line i, the line address module 82 can generate selectively, one of three pertinent addresses, $L_1$, $L_2$, and $L_3$ wherein:

$L_1 = Mod_{21}(T+i-1\phi)$ $L_2 = Mod_{21}(T+i)$, (center of window)

$L_3 = Mod_{21}(T+i+9)$

In the above equations, T relates to the first 19 scan lines of input (border information). The $L_1$, $L_2$, and $L_3$ addresses are selected via the SEL. L ports of PROM #6 (FIG. 9A) as follows:

| SEL. L | Address Output |
|---|---|
| 00 | $L_2$ |
| 01 | $L_3$ |
| 10 | $L_2$ |
| 11 | $L_1$ |

The outputs of the line address module 82 and the pixel address module 84 are fed into the buffer address map module 86 (FIG. 9A) which is simply a look up table. The module 86 implements the following equation:

$$\text{Buffer Address} = 64\phi . \text{ Line Address} + \text{Pixel address.}$$

In order to illustrate the scheme for generating a buffer address for the buffer memory 34, consider the address of a pixel which is located in Row #i and results from a Scan #Q, coming from the scanner module 18 via the edge enhancement module 36. The scan line #Q is address in the buffer memory 34 by selecting SEL. $L=1\phi$; this selects the $L_2$ output of the line address module 82, wherein:

$$L_2 = MOD_{21}(T+Q)$$

Similarly, the pixel in Row #i is addressed by selecting the SEL. $P=1\phi$; this selects the $P_2$ output of the pixel address module 84 wherein:

$$P_2 = i$$

The buffer address map module 86, in turn would output the correct address for the buffer memory 34 which is:

$$\text{Buffer address} = 64\phi.\ L_2 + P_2$$

The high pass filter module 38 best shown in FIGS. 9A–9D may be implemented by a microcode program, utilizing the general instructions offered by American Microdevices, Inc. Reference may be made to the Advanced Microdevices Handbook which is published by American Devices, Inc. for a more detailed definition and explanation of the various codes and instructions used therein. The microcode program which will be listed later herein consists of meta assembler commands which define what the sequencer 76 (FIG. 9B) and the processor (ALU 78 in FIG. 9D) are doing on a step by step basis. The sequencer 76, in the embodiment described, is a #291ϕ integrated circuit and the ALU 78 is comprised of four #2901 integrated circuits which are all manufactured by American Microdevices, Inc.

Listing #1 contains various definitions used in the microcode program for the high pass filter module 38. Listing #2 contains the various sequences for the steps down in FIGS. 11A through 11E. For example, sequence #ϕϕϕ1 in Listing #2 corresponds to step #122 shown in FIG. 11A; the sequence numbers from the Listing #2 are shown in parenthesis next to the associated step in FIGS. 11A through 11E so as to provide a correlation therebetween.

Listing #3 contains the 56 bit wide data word which is outputted from the PROMS #1 through #7 for each of the sequences from ϕϕϕϕ through ϕϕ28.

Listing #4 contains the PROM map and PROM contents for PROMS #1–7 shown in FIGS. #9A–9D.

Listing #1

"Definitions Used In Microcode Program for High Pass Filter Module 38"

```
                REGISTERS
R∅              EQU         H#∅
R1:             EQU         H#1
R2:             EQU         H#2
R3:             EQU         H#3
R4:             EQU         H#4
R5:             EQU         H#5
R6:             EQU         H#6
R7:             EQU         H#7
R8:             EQU         H#8
R9:             EQU         H#9
R1∅:            EQU         H#A
R11:            EQU         H#B
R12:            EQU         H#C
R13:            EQU         H#D
R14:            EQU         H#E
R15:            EQU         H#F

                291∅        OP CODES (for Sequencer 76)
JZ:             EQU         H#∅
CJS:            EQU         H#1
JMAP:           EQU         H#2
CJP:            EQU         H#3
```

```
PUSH:      EQU      H#4
JSRP:      EQU      H#5
CJV:       EQU      H#6
JRP:       EQU      H#7
RFCT:      EQU      H#8
RPCT:      EQU      H#9
CRTN:      EQU      H#A
CJPP:      EQU      H#B
LDCT:      EQU      H#C
LOOP:      EQU      H#D
CONT:      EQU      H#E
TWB:       EQU      H#F

           29Ø1     OP CODES (for ALU 78)
DESTINATIONS        (29Ø1)
LQ:        EQU      Q#Ø
NOP:       EQU      Q#1
LRA:       EQU      Q#2
LRF:       EQU      Q#3
LRQD:      EQU      Q#4
LRD:       EQU      Q#5
LRQU:      EQU      Q#6
LRU:       EQU      Q#7

FUNCTIONS           (29Ø1) - (ALU 78)
ADD:       EQU      Q#Ø
SUBR:      EQU      Q#1
SUBS:      EQU      Q#2
OR:        EQU      Q#3
AND:       EQU      Q#4
NOTRS:     EQU      Q#5
EXOR:      EQU      Q#6
EXNOR:     EQU      Q#7

SOURCE              (29Ø1) - (ALU 78)
AQ:        EQU      Q#Ø
AB:        EQU      Q#1
ZQ:        EQU      Q#2
```

```
ZB:         EQU      Q#3
ZA:         EQU      Q#4
DA:         EQU      Q#5
DQ:         EQU      Q#6
DZ:         EQU      Q#7

SEQUENCER 76         CONDITION        SELECTS
DIAG:       EQU      Q#Ø         ;DIAGNOSTICS
ILR:        EQU      Q#1         ;INPUT LINE REQUEST
PXR:        EQU      Q#2         ;OUTPUT PIXEL REQUEST
OVR:        EQU      Q#5         ;ALU OVERFLOW
FZERO:      EQU      Q#6         ;ALU ZERO OUTPUT
FULL:       EQU      Q#7         ;SEQ STACK FULL
29Ø1        INPUT    SELECTS (for ALU 78)
DATB:       EQU      B#ØØ        ;DATA BUFFER
SCR:        EQU      B#Ø1        ;SCRATCH BUFFER
BUF:        EQU      B#1Ø        ;PIXEL BUFFER
ZERO:       EQU      B#11        ;ZERO

            ADDRESS SELECTS
LØ:         EQU      B#11
L2:         EQU      B#1Ø
L3:         EQU      B#Ø1
P1:         EQU      B#11
P2:         EQU      P#1Ø
P3:         EQU      B#Ø1

            ADDRESS CONTROL CONSTANTS
            LOAD/
LOADN:      EQU      B#Ø
            INCR LINE CTR
LCLK:       EQU      B#1
            INCR PIXEL CTR
PCLK:       EQU      B#1

            INTERFACE CONSTANTS
            DIAG AKNOWLEDGE/
DACKN:      EQU      B#Ø
```

```
         BUFFER WRITE DISABLE
WD:      EQU        B#1
         BUFFER READ
BR:      EQU        B#1
         SCRATCH WRITE/
WRTSCR:  EQU        B#Ø
         OUTPUT LINE REQUEST
OLR:     EQU        B#1
         LATCH
LATCH:   EQU        B#1
         LINE ACK/
LACKN:   EQU        B#Ø
         OUT
OUT:     EQU        B#1
         29Ø1 CONSTANTS (for ALU 78)
CI:      EQU        B#1

         291Ø CONSTANTS (for Sequencer 76)
         REGISTER LOAD/
RLDN:        EQU        B#Ø
CISEQN:  EQU        B#Ø

         FIELD DESCRIPTIONS

291Ø (for Sequencer 76)
                    15X,RLDN,CISEQN,OPCODE,CCSEL,32X
SEQ:     DEF        15X,1VB#1,1VB#1,4VH#E,3VX,32X

         29Ø1 (for ALU 78)
                    36X,CI,DEST,FUNC,SOURCE,DSEL,8X
ALU:     DEF        36X,1VB#Ø,3VX,3VX,3VX,2VX,8X
         A PORT
APORT:   DEF        48X,4VX,4X
         B PORT
BPORT:   DEF        52X,4VX

         DATA FIELD
DATAIN:  DEF        24X,12VX,2ØX
```

```
        ADDRESS CONTROL
                        8X,LOADN,LSEL,LCLK,PSEL,PCLK,41X
ADDR:   DEF             8X,1VB#1,2VB#1Ø,1VB#Ø,2VB#1Ø,1VB#Ø,
                        41X

        INTERFACE FIELD
                        DACKN,WD,BR,WRTSCR,OLD
                                ,OUT,LATCH,LACKN,48X
HNDSK:  DEF             1VB#1,1VB#Ø,1VB#Ø,1VB#1,1VB#Ø
                                ,1VB#Ø,1VB#Ø,1VB#1,48X

        END
```

Listing #2
"Microcode for High Pass Filter Module 38"

```
   ;    ZERO SCRATCH
   ;
ØØØØ    HNDSK & ADDR LOADN,L2,,P2, & SEQ ,,CJV,DIAG
   /          & ALU ,LQ,AND,ZQ,
   ;
   ;
ØØØ1    HNDSK & ADDR LOADN,L2,LCLK,P2,PCLK &
   /            SEQ RLDN,,PUSH & DATAIN D#639% &
   /            ALU ,LRF,AND,ZQ,
   ;
   ;
ØØØ2    HNDSK ,,,WRTSCR,,,, & ADDR ,L2,,P2, & SEQ
   /          & ALU ,NOP,OR,ZQ,BUF
   ;
   ;
ØØØ3    HNDSK & ADDR ,L2,,P2,PCLK & SEQ ,,RFCT,
   /          & DATAIN D#19% & ALU ,LRF,OR,DZ,DATB
   ;
   ;

   ;    ADD 19 LINES INTO SCRATCH
   ;
   ;
```

```
ØØØ4        HNDSK & ADDR ,L2,,P2, & SEQ RLDN ,,PUSH,
    /             & DATAIN H#ØØ5% & ALU ,LRF,OR,DZ,
    ;
    ;
ØØØ5        HNDSK & ADDR ,LØ,LCLK,P2, & SEQ ,,JRP,ILR
    /             & DATAIN H#ØØ6% & ALU ,NOP,OR,ZQ,
    /             & APORT H#Ø% & BPORT H#Ø%
    ;
    ;
ØØØ6        HNDSK ,WD,,,,,, & ADDR ,LØ,,P2, &
    /               SEQ RLDN,,PUSH, & DATAIN D#639%
    /             & ALU ,NOP,OR,ZQ,SCR
    ;
    ;
ØØØ7        HNDSK ,WD,BR,,,,, & ADDR ,LØ,,P2, & SEQ
    /               & ALU ,LQ,OR,DZ,BUF
    ;
    ;
ØØØ8        HNDSK ,,,WRTSCR,,,, & ADDR ,LØ,,P2, & SEQ
    /               & ALU ,NOP,ADD,DQ,
    ;
    ;
ØØØ9        HNDSK ,WD,,,,, & ADDR ,LØ,,P2,PCLK &
    /                 SEQ ,,RFCT, & ALU ,NOP,SUBR,ZA,SCR
    /               & APORT H#Ø% & BPORT H#Ø%
    ;
    ;
ØØØA        HNDSK ,,,,,,,LACKN & ADDR ,LØ,,P2,
    /               & SEQ RLDN,,LOOP,FZERO
    /               & DATAIN H#ØØ5% & ALU ,LRF,SUBR,ZA,
    /               & APORT H#Ø% & BPORT H#Ø%
    ;
    ;
    ;               INITIALIZATION COMPLETE
    ;

    ;               WAIT FOR NEW LINE
    ;
```

```
ØØØB        HNDSK    & ADDR LOADN,L2,,P2, & SEQ RLDN,,,
    /                & DATAIN H#
ØØC%
    /                & ALU NOP,OR,ZQ,DATB
    ;
    ;
ØØØC        HNDSK    & ADDR LOADN,LØ,LCLK,P2,PCLK
    /                & SEQ ,,JRP,ILR & DATAIN H#ØØD%
    /                & ALU ,NOP,SUBR,ZA, & APORT H#Ø%
    /                & BPORT H#Ø%
    ;

    ;       CALCULATE AREA FOR P2 = Ø UPDATE SCR LOCATIONS
            Ø to 9
    ;
    ;
ØØØD        HNDSK & ADDR ,LØ,,P1,
    /             & SEQ RLDN,,PUSH, & DATAIN D#ØØ8%
    /             & ALU , LRF,AND,ZQ,SCR
    /             & APORT H#Ø% & BPORT H#Ø%
    ;
    ;
    ;
ØØØE        HNDSK ,WD,,,,,, & ADDR ,LØ,,P2, & SEQ
    /             & ALU ,LRF,ADD,DA,SCR
    ;
    ;
ØØØF        HNDSK ,WD,BR,,,,, & ADDR ,L3,,P2, & SEQ
    /             & ALU ,LQ,OR,DZ,BUF
    ;
    ;
ØØ1Ø        HNDSK ,WD,BR,,,,, & ADDR ,L3,,P2, & SEQ
    /             & ALU CI,LQ,SUBR,DQ,BUF
    ;
    ;
ØØ11        HNDSK ,,,WRTSCR,,,, & ADDR ,L3,,P2, & SEQ
    /             & ALU ,LQ,ADD,DQ,
    ;
    ;
```

```
ØØ12      HNDSK & ADDR ,LØ,,P1,PCLK & SEQ ,,RFCT,
   /            & ALU ,LRF,ADD,AQ,SCR & APORT H#Ø%
                & BPORT H#Ø%
   ;
   ;
   ;
   ;      OUTPUT PIXEL # Ø
   ;
   ;
ØØ13      HNDSK & ADDR LOADN,LØ,,P2, & SEQ
   /            & ALU ,NOP,OR,ZQ,
   /            & APORT H#Ø% & BPORT H#Ø%
   ;
   ;
ØØ14      HNDSK ,WD,,,,,, & ADDR LOADN,LØ,,P3,PCLK & SEQ
   /            & ALU ,NOP,OR,ZQ,SCR
   /            & APORT H#Ø% & BPORT H#Ø%
   ;
   ;
ØØ15      HNDSK ,WD,BR,,,,, & ADDR ,L3,,P3, & SEQ
   /            & ALU ,LQ,OR,DZ,BUF
   /            & APORT H#Ø% & BPORT H#Ø%
   ;
   ;
ØØ16      HNDSK ,WD,BR,,,,, & ADDR ,L2,,P2, & SEQ
   /            & ALU CI,LQ,SUPR,DQ,BUF
   ;
   ;
ØØ17      HNDSK ,WD,BR,WRTSCR,,,, & ADDR ,L2,,P3, & SEQ
   /            & ALU ,LQ,ADD,DQ,BUF
   ;
   ;
ØØ18      HNDSK & ADDR ,L2,,P1, & SEQ
   /            & ALU ,LRF,ADD,AQ,SCR
   /            & APORT H#Ø% & BPORT H#Ø%
   ;
   ;
```

```
ØØ19        HNDSK ,WD,,,,,LATCH, & ADDR ,LØ,,P3,PCLK
   /              & SEQ RLDN,,PUSH,
   /              & ALU CI,LRA,SUBR,DA,SCR
   /              & DATAIN D#629% & APORT H#Ø%
   /              & BPORT H#Ø%
   ;
   ;
   ;
   ;        OUTPUT PIXELS #1 TO #63Ø
   ;
   ;
ØØ1A        HNDSK ,WD,BR,,,OUT,, & ADDR ,L3,,P3, & SEQ
   /                & ALU ,LQ,OR,DZ,BUF
   ;
   ;
ØØ1B        HNDSK ,WD,BR,,,,, & ADDR ,L2,,P2, & SEQ
   /                & ALU CI,LQ,SUBR,DQ,BUF
   ;
   ;
ØØ1C        HNDSK ,WD,BR,WRTSCR,,,, & ADDR ,L2,,P3, & SEQ
   /                & ALU ,LQ,ADD,DQ,BUF
   ;
   ;
ØØ1D        HNDSK & ADDR ,LØ,,P1, & SEQ
   /              & ALU ,LRF,ADD,AQ,SCR
   /              & APORT H#Ø% & BPORT H#Ø%
   ;
   ;
ØØ1E        HNDSK ,,,,,,LATCH, & ADDR ,LØ,,P3,PCLK
   /              & SEQ ,,CJP,PXR & DATAIN H#Ø1E%
   /              & ALU CI,LRA,SUBR,DA,ZERO
   /              & APORT H#Ø% & BPORT H#Ø%
   ;
   ;
ØØ1F        HNDSK ,WD,,,,OUT,, & ADDR ,LØ,,P3, &
   /                SEQ ,,RFCT, & ALU ,NOP,OR,ZQ,SCR
   ;
   ;
   ;
```

```
;       OUTPUT PIXELS #631 to #639
;
;
ØØ2Ø    HNDSK ,,,,,OUT,, & ADDR ,L2,,P3, &
  /           SEQ RLDN,,PUSH, & DATAIN H#ØØ8%
  /         & ALU ,NOP,OR,ZQ,SCR
;
;
ØØ21    HNDSK ,WD,,,,OUT,, & ADDR ,L2,,P2, & SEQ
  /           & ALU ,LRF,ADD,DA, & APORT H#Ø%
  /           & BPORT H#Ø%
;
;
ØØ22    HNDSK ,WD,BR,,,,, & ADDR ,L2,P2, & SEQ
  /           & ALU, NOP,OR,ZA,BUF
  /           & APORT H#Ø% & BPORT H#Ø%
;
;
ØØ23    HNDSK & ADDR ,L2,,P1, & SEQ
  /           & ALU ,NOP,OR,ZA, & APORT H#Ø%
  /           & BPORT H#Ø%
;
;
ØØ24    HNDSK ,,,,,,LATCH, & ADDR ,L2,,P1, &
  /             SEQ ,,CJP,PXR & DATAIN H#Ø24%
  /           & ALU ,NOP,OR,ZQ,SCR
;
;
ØØ25    HNDSK & ADDR ,L2,,P3,PCLK & SEQ ,,RFCT,
  /           & ALU CI,LRF,SUBR,DA,SCR
;
;
;
;       WAIT FOR NEXT LINE
;
;
```

```
ØØ26        HNDSK ,,,,OLR,OUT,,LACKN & ADDR ,L2,LCLK,P2,
   /              & SEQ & ALU ,NOP,OR,ZQ,
   ;
   ;
ØØ27        HNDSK & ADDR LOADN,L2,,P2, & SEQ RLDN,,,
   /              & DATAIN H#Ø28% & ALU ,NOP,OR,ZQ,
   ;
   ;
ØØ28        HNDSK & ADDR LOADN,L2,,P2,PCLK & SEQ ,,JRP,ILR
   /            & DATAIN H#ØØD% & ALU ,NOP,OR,ZQ,
   ;
   ;
   ;
   ;
   END
```

Listing #3

```
ØØØØ  1ØØ1ØØØ1Ø1ØØ1ØØ1  1Ø11ØØØØXXXXXXXX  XXXXØØØØ1ØØØ1ØXX  XXXXXXXX
ØØØ1  1ØØ1ØØØ1Ø1Ø11Ø1Ø  1Ø1ØØXXXØØ1ØØ111  1111ØØ111ØØØ1ØXX  XXXXXXXX
ØØØ2  1ØØØØØØ111ØØ1ØØ1  1111ØXXXXXXXXXXX  XXXXØØØ1Ø11Ø1Ø1Ø  XXXXXXXX
ØØØ3  1ØØ1ØØØ111ØØ1Ø11  11ØØØXXXØØØØØØØ1  ØØ11ØØ11Ø11111ØØ  XXXXXXXX
ØØØ4  1ØØ1ØØØ111ØØ1ØØØ  1Ø1ØØXXXØØØØØØØØ  Ø1Ø1ØØ11Ø11111XX  XXXXXXXX
ØØØ5  1ØØ1ØØØ111111ØØ1  1Ø111ØØ1ØØØØØØØØ  Ø11ØØØØ1Ø11Ø1ØXX  ØØØØØØØØ
ØØØ6  11Ø1ØØØ1111Ø1ØØØ  1Ø1ØØXXXØØ1ØØ111  1111ØØØ1Ø11Ø1ØØ1  XXXXXXXX
ØØØ7  1111ØØØ1111Ø1ØØ1  1111ØXXXXXXXXXXX  XXXXØØØØØ111111Ø  XXXXXXXX
ØØØ8  1ØØØØØØ1111Ø1ØØ1  1111ØXXXXXXXXXXX  XXXXØØØ1ØØØ11ØXX  XXXXXXXX
ØØØ9  11Ø1ØØØ1111Ø1Ø11  11ØØØXXXXXXXXXXX  XXXXØØØ1ØØ11ØØØ1  ØØØØØØØØ
ØØØA  1ØØ1ØØØØ111Ø1ØØØ  111Ø111ØØØØØØØØØ  Ø1Ø1ØØ11ØØ11ØØXX  ØØØØØØØØ
ØØØB  1ØØ1ØØØ1Ø1ØØ1ØØØ  1111ØXXXØØØØØØØØ  11ØØ1Ø11Ø1ØØØØXX  XXXXXXXX
ØØØC  1ØØ1ØØØ1Ø1111Ø11  1Ø111ØØ1ØØØØØØØØ  11Ø1ØØØ1ØØ11ØØXX  ØØØØØØØØ
ØØØD  1ØØ1ØØØ1111Ø11ØØ  1Ø1ØØXXXØØØØØØØØ  1ØØØØØ111ØØØ1ØØ1  ØØØØØØØØ
ØØØE  11Ø1ØØØ1111Ø1ØØ1  1111ØXXXXXXXXXXX  XXXXØØ11ØØØ1Ø1Ø1  XXXXXXXX
ØØØF  1111ØØØ11Ø1Ø1ØØ1  1111ØXXXXXXXXXXX  XXXXØØØØØ111111Ø  XXXXXXXX
ØØ1Ø  1111ØØØ11Ø1Ø1ØØ1  1111ØXXXXXXXXXXX  XXXX1ØØØØØ111Ø1Ø  XXXXXXXX
ØØ11  1ØØØØØØ11Ø1Ø1ØØ1  1111ØXXXXXXXXXXX  XXXXØØØØØØØ11ØXX  XXXXXXXX
ØØ12  1ØØ1ØØØ1111Ø1111  11ØØØXXXXXXXXXXX  XXXXØØ11ØØØØØØØ1  ØØØØØØØØ
ØØ13  1ØØ1ØØØ1Ø11Ø1ØØ1  1111ØXXXXXXXXXXX  XXXXØØØ1Ø11Ø1ØXX  ØØØØØØØØ
ØØ14  11Ø1ØØØ1Ø11ØØ111  1111ØXXXXXXXXXXX  XXXXØØØ1Ø11Ø1ØØ1  ØØØØØØØØ
ØØ15  1111ØØØ11Ø1ØØ1Ø1  1111ØXXXXXXXXXXX  XXXXØØØØØ111111Ø  ØØØØØØØØ
```

Listing #3
(Concluded)

```
ØØ16  1111ØØØ111ØØ1ØØ1  1111ØXXXXXXXXXXX  XXXX1ØØØØ111Ø1Ø  XXXXXXXX
ØØ17  111ØØØØ111ØØØ1Ø1  1111ØXXXXXXXXXXX  XXXXØØØØØØØ11Ø1Ø  XXXXXXXX
ØØ18  1ØØ1ØØØ111ØØ11Ø1  1111ØXXXXXXXXXXX  XXXXØØ11ØØØØØØ1  ØØØØØØØØ
ØØ19  11Ø1ØØ11111ØØ11Ø  1Ø1ØØXXXØØ1ØØ111  Ø1Ø11Ø1ØØØ11Ø1Ø1  ØØØØØØØØ
ØØ1A  1111Ø1Ø11Ø1ØØ1Ø1  1111ØXXXXXXXXXXX  XXXXØØØØ111111Ø  XXXXXXXX
ØØ1B  1111ØØØ111ØØ1ØØ1  1111ØXXXXXXXXXXX  XXXX1ØØØØ111Ø1Ø  XXXXXXXX
ØØ1C  111ØØØØ111ØØØ1Ø1  1111ØXXXXXXXXXXX  XXXXØØØØØØØ11Ø1Ø  XXXXXXXX
ØØ1D  1ØØ1ØØØ1111Ø11Ø1  1111ØXXXXXXXXXXX  XXXXØØ11ØØØØØØ1  ØØØØØØØØ
ØØ1E  1ØØ1ØØ11111ØØ111  1ØØ11Ø1ØØØØØØØØ1  111Ø1Ø1ØØØ11Ø111  ØØØØØØØØ
ØØ1F  11Ø1Ø1Ø1111ØØ1Ø1  11ØØØXXXXXXXXXXX  XXXXØØØ1Ø11Ø1ØØ1  XXXXXXXX
ØØ2Ø  1ØØ1Ø1Ø111ØØØ1ØØ  1Ø1ØØXXXØØØØØØØØ  1ØØØØØØ1Ø11Ø1ØØ1  XXXXXXXX
ØØ21  11Ø1Ø1Ø111ØØ1ØØ1  1111ØXXXXXXXXXXX  XXXXØØ11ØØØ1Ø1XX  ØØØØØØØØ
ØØ22  1111ØØØ111ØØ1ØØ1  1111ØXXXXXXXXXXX  XXXXØØØ1Ø111ØØ1Ø  ØØØØØØØØ
ØØ23  1ØØ1ØØØ111ØØ11Ø1  1111ØXXXXXXXXXXX  XXXXØØØ1Ø111ØØXX  ØØØØØØØØ
ØØ24  1ØØ1ØØ1111ØØ11Ø1  1ØØ11Ø1ØØØØØØØ1Ø  Ø1ØØØØØ1Ø11Ø1ØØ1  XXXXXXXX
ØØ25  1ØØ1ØØØ111ØØØ111  11ØØØXXXXXXXXXXX  XXXX1Ø11ØØ11Ø1Ø1  XXXXXXXX
ØØ26  1ØØ111ØØ11Ø11ØØ1  1111ØXXXXXXXXXXX  XXXXØØØ1Ø11Ø1ØXX  XXXXXXXX
ØØ27  1ØØ1ØØØ1Ø1ØØ1ØØØ  1111ØXXXØØØØØØ1Ø  1ØØØØØØ1Ø11Ø1ØXX  XXXXXXXX
ØØ28  1ØØ1ØØØ1Ø1ØØ1Ø11  1Ø111ØØ1ØØØØØØØØ  11Ø1ØØØ1Ø11Ø1ØXX  XXXXXXXX
```

Listing #4

PROM MAP

| | PC | C1 | C2 | C3 | C4 | C5 | C6 | C7 |
|---|---|---|---|---|---|---|---|---|
| R1 | ØØØØ | 1 | 2 | 3 | 4 | 5 | 6 | 7 |

PROM CONTENTS

| PC | ADD | PROM #7 | PROM #6 | PROM #5 | PROM #4 | PROM #3 | PROM #2 | PROM #1 |
|---|---|---|---|---|---|---|---|---|
| ØØØØ | ØØØ | 1ØØ1ØØØ1 | Ø1ØØ1ØØ1 | 1Ø11ØØØØ | ØØØØØØØØ | ØØØØØØØØ | 1ØØØ1ØØØ | ØØØØØØØØ |
| ØØØ1 | ØØ1 | 1ØØ1ØØØ1 | Ø1Ø11Ø1Ø | 1Ø1ØØØØØ | ØØ1ØØ111 | 1111ØØ11 | 1ØØØ1ØØØ | ØØØØØØØØ |
| ØØØ2 | ØØ2 | 1ØØØØØØ1 | 11ØØ1ØØ1 | 1111ØØØØ | ØØØØØØØØ | ØØØØØØØ1 | Ø11Ø1Ø1Ø | ØØØØØØØØ |
| ØØØ3 | ØØ3 | 1ØØ1ØØØ1 | 11ØØ1Ø11 | 11ØØØØØØ | ØØØØØØØ1 | ØØ11ØØ11 | Ø11111ØØ | ØØØØØØØØ |
| ØØØ4 | ØØ4 | 1ØØ1ØØØ1 | 11ØØ1ØØØ | 1Ø1ØØØØØ | ØØØØØØØØ | Ø1Ø1ØØ11 | Ø11111ØØ | ØØØØØØØØ |
| ØØØ5 | ØØ5 | 1ØØ1ØØØ1 | 11111ØØ1 | 1Ø111ØØ1 | ØØØØØØØØ | Ø11ØØØØ1 | Ø11Ø1ØØØ | ØØØØØØØØ |
| ØØØ6 | ØØ6 | 11Ø1ØØØ1 | 111Ø1ØØØ | 1Ø1ØØØØØ | ØØ1ØØ111 | 1111ØØØ1 | Ø11Ø1ØØ1 | ØØØØØØØØ |
| ØØØ7 | ØØ7 | 1111ØØØ1 | 111Ø1ØØ1 | 1111ØØØØ | ØØØØØØØØ | ØØØØØØØØ | Ø111111Ø | ØØØØØØØØ |
| ØØØ8 | ØØ8 | 1ØØØØØØ1 | 111Ø1ØØ1 | 1111ØØØØ | ØØØØØØØØ | ØØØØØØØ1 | ØØØ11ØØØ | ØØØØØØØØ |
| ØØØ9 | ØØ9 | 11Ø1ØØØ1 | 111Ø1Ø11 | 11ØØØØØØ | ØØØØØØØØ | ØØØØØØØ1 | ØØ11ØØØ1 | ØØØØØØØØ |
| ØØØA | ØØA | 1ØØ1ØØØØ | 111Ø1ØØØ | 111Ø111Ø | ØØØØØØØØ | Ø1Ø1ØØ11 | ØØ11ØØØØ | ØØØØØØØØ |
| ØØØB | ØØB | 1ØØ1ØØØ1 | Ø1ØØ1ØØØ | 1111ØØØØ | ØØØØØØØØ | 11ØØ1Ø11 | Ø1ØØØØØØ | ØØØØØØØØ |
| ØØØC | ØØC | 1ØØ1ØØØ1 | Ø1111Ø11 | 1Ø111ØØ1 | ØØØØØØØØ | 11Ø1ØØØ1 | ØØ11ØØØØ | ØØØØØØØØ |
| ØØØD | ØØD | 1ØØ1ØØØ1 | 111Ø11ØØ | 1Ø1ØØØØØ | ØØØØØØØØ | 1ØØØØØ11 | 1ØØØ1ØØ1 | ØØØØØØØØ |
| ØØØE | ØØE | 11Ø1ØØØ1 | 111Ø1ØØ1 | 1111ØØØØ | ØØØØØØØØ | ØØØØØØ11 | ØØØ1Ø1Ø1 | ØØØØØØØØ |
| ØØØF | ØØF | 1111ØØØ1 | 1Ø1Ø1ØØ1 | 1111ØØØØ | ØØØØØØØØ | ØØØØØØØØ | Ø111111Ø | ØØØØØØØØ |
| ØØ1Ø | Ø1Ø | 1111ØØØ1 | 1Ø1Ø1ØØ1 | 1111ØØØØ | ØØØØØØØØ | ØØØØ1ØØØ | ØØ111Ø1Ø | ØØØØØØØØ |

Listing #4
(Continued)

| PC | ADD | PROM #7 | PROM #6 | PROM #5 | PROM #4 | PROM #3 | PROM #2 | PROM #1 |
|---|---|---|---|---|---|---|---|---|
| ØØ11 | Ø11 | 1ØØØØØØ1 | 1Ø1Ø1ØØ1 | 1111ØØØØ | ØØØØØØØØ | ØØØØØØØØ | ØØØ11ØØØ | ØØØØØØØØ |
| ØØ12 | Ø12 | 1ØØ1ØØØ1 | 111Ø1111 | 11ØØØØØØ | ØØØØØØØØ | ØØØØØØ11 | ØØØØØØØ1 | ØØØØØØØØ |
| ØØ13 | Ø13 | 1ØØ1ØØØ1 | Ø11Ø1ØØ1 | 1111ØØØØ | ØØØØØØØØ | ØØØØØØØ1 | Ø11Ø1ØØØ | ØØØØØØØØ |
| ØØ14 | Ø14 | 11Ø1ØØØ1 | Ø11ØØ111 | 1111ØØØØ | ØØØØØØØØ | ØØØØØØØ1 | Ø11Ø1ØØ1 | ØØØØØØØØ |
| ØØ15 | Ø15 | 1111ØØØ1 | 1Ø1ØØ1Ø1 | 1111ØØØØ | ØØØØØØØØ | ØØØØØØØØ | Ø111111Ø | ØØØØØØØØ |
| ØØ16 | Ø16 | 1111ØØØ1 | 11ØØ1ØØ1 | 1111ØØØØ | ØØØØØØØØ | ØØØØ1ØØØ | ØØ11101Ø | ØØØØØØØØ |
| ØØ17 | Ø17 | 111ØØØØ1 | 11ØØØ1Ø1 | 1111ØØØØ | ØØØØØØØØ | ØØØØØØØØ | ØØØ11Ø1Ø | ØØØØØØØØ |
| ØØ18 | Ø18 | 1ØØ1ØØØ1 | 11ØØ11Ø1 | 1111ØØØØ | ØØØØØØØØ | ØØØØØØ11 | ØØØØØØØ1 | ØØØØØØØØ |
| ØØ19 | Ø19 | 11Ø1ØØ11 | 111ØØ11Ø | 1Ø1ØØØØØ | ØØ1ØØ111 | Ø1Ø11Ø1Ø | ØØ11Ø1Ø1 | ØØØØØØØØ |
| ØØ1A | Ø1A | 1111Ø1Ø1 | 1Ø1ØØ1Ø1 | 1111ØØØØ | ØØØØØØØØ | ØØØØØØØØ | Ø111111Ø | ØØØØØØØØ |
| ØØ1B | Ø1B | 1111ØØØ1 | 11ØØ1ØØ1 | 1111ØØØØ | ØØØØØØØØ | ØØØØ1ØØØ | ØØ111Ø1Ø | ØØØØØØØØ |
| ØØ1C | Ø1C | 111ØØØØ1 | 11ØØØ1Ø1 | 1111ØØØØ | ØØØØØØØØ | ØØØØØØØØ | ØØØ11Ø1Ø | ØØØØØØØØ |
| ØØ1D | Ø1D | 1ØØ1ØØØ1 | 111Ø11Ø1 | 1111ØØØØ | ØØØØØØØØ | ØØØØØØ11 | ØØØØØØØ1 | ØØØØØØØØ |
| ØØ1E | Ø1E | 1ØØ1ØØ11 | 111ØØ111 | 1ØØ11Ø1Ø | ØØØØØØØ1 | 111Ø1Ø1Ø | ØØ11Ø111 | ØØØØØØØØ |
| ØØ1F | Ø1F | 11Ø1Ø1Ø1 | 111ØØ1Ø1 | 11ØØØØØØ | ØØØØØØØØ | ØØØØØØØ1 | Ø11Ø1ØØ1 | ØØØØØØØØ |
| ØØ2Ø | Ø2Ø | 1ØØ1Ø1Ø1 | 11ØØØ1ØØ | 1Ø1ØØØØØ | ØØØØØØØØ | 1ØØØØØØ1 | Ø11Ø1ØØ1 | ØØØØØØØØ |
| ØØ21 | Ø21 | 11Ø1Ø1Ø1 | 11ØØ1ØØ1 | 1111ØØØØ | ØØØØØØØØ | ØØØØØØ11 | ØØØ1Ø1ØØ | ØØØØØØØØ |
| ØØ22 | Ø22 | 1111ØØØ1 | 11ØØ1ØØ1 | 1111ØØØØ | ØØØØØØØØ | ØØØØØØØ1 | Ø111ØØ1Ø | ØØØØØØØØ |
| ØØ23 | Ø23 | 1ØØ1ØØØ1 | 11ØØ11Ø1 | 1111ØØØØ | ØØØØØØØØ | ØØØØØØØ1 | Ø111ØØØØ | ØØØØØØØØ |
| ØØ24 | Ø24 | 1ØØ1ØØ11 | 11ØØ11Ø1 | 1ØØ11Ø1Ø | ØØØØØØ1Ø | Ø1ØØØØØ1 | Ø11Ø1ØØ1 | ØØØØØØØØ |
| ØØ25 | Ø25 | 1ØØ1ØØØ1 | 11ØØØ111 | 11ØØØØØØ | ØØØØØØØØ | ØØØØ1Ø11 | ØØ11Ø1Ø1 | ØØØØØØØØ |

Listing #4
(Continued)

| PC | ADD | PROM #7 | PROM #6 | PROM #5 | PROM #4 | PROM #3 | PROM #2 | PROM #1 |
|---|---|---|---|---|---|---|---|---|
| ØØ26 | Ø26 | 1ØØ111ØØ | 11Ø11ØØ1 | 1111ØØØØ | ØØØØØØØØ | ØØØØØØØ1 | Ø11Ø1ØØØ | ØØØØØØØØ |
| ØØ27 | Ø27 | 1ØØ1ØØØ1 | Ø1ØØ1ØØØ | 1111ØØØØ | ØØØØØØ1Ø | 1ØØØØØØ1 | Ø11Ø1ØØØ | ØØØØØØØØ |
| ØØ28 | Ø28 | 1ØØ1ØØØ1 | Ø1ØØ1Ø11 | 1Ø111ØØ1 | ØØØØØØØØ | 11Ø1ØØØ1 | Ø11Ø1ØØØ | ØØØØØØØØ |
| ØØ29 | Ø29 | ØØØØØØØØ | ØØØØØØØØ | ØØØØØØØØ | ØØØØØØØØ | ØØØØØØØØ | ØØØØØØØØ | ØØØØØØØØ |
| ØØ2A | Ø2A | ØØØØØØØØ | ØØØØØØØØ | ØØØØØØØØ | ØØØØØØØØ | ØØØØØØØØ | ØØØØØØØØ | ØØØØØØØØ |
| ØØ2B | Ø2B | ØØØØØØØØ | ØØØØØØØØ | ØØØØØØØØ | ØØØØØØØØ | ØØØØØØØØ | ØØØØØØØØ | ØØØØØØØØ |
| ØØ2C | Ø2C | ØØØØØØØØ | ØØØØØØØØ | ØØØØØØØØ | ØØØØØØØØ | ØØØØØØØØ | ØØØØØØØØ | ØØØØØØØØ |
| ØØ2D | Ø2D | ØØØØØØØØ | ØØØØØØØØ | ØØØØØØØØ | ØØØØØØØØ | ØØØØØØØØ | ØØØØØØØØ | ØØØØØØØØ |
| ØØ2E | Ø2E | ØØØØØØØØ | ØØØØØØØØ | ØØØØØØØØ | ØØØØØØØØ | ØØØØØØØØ | ØØØØØØØØ | ØØØØØØØØ |
| ØØ2F | Ø2F | ØØØØØØØØ | ØØØØØØØØ | ØØØØØØØØ | ØØØØØØØØ | ØØØØØØØØ | ØØØØØØØØ | ØØØØØØØØ |
| ØØ3Ø | Ø3Ø | ØØØØØØØØ | ØØØØØØØØ | ØØØØØØØØ | ØØØØØØØØ | ØØØØØØØØ | ØØØØØØØØ | ØØØØØØØØ |
| ØØ31 | Ø31 | ØØØØØØØØ | ØØØØØØØØ | ØØØØØØØØ | ØØØØØØØØ | ØØØØØØØØ | ØØØØØØØØ | ØØØØØØØØ |
| ØØ32 | Ø32 | ØØØØØØØØ | ØØØØØØØØ | ØØØØØØØØ | ØØØØØØØØ | ØØØØØØØØ | ØØØØØØØØ | ØØØØØØØØ |
| ØØ33 | Ø33 | ØØØØØØØØ | ØØØØØØØØ | ØØØØØØØØ | ØØØØØØØØ | ØØØØØØØØ | ØØØØØØØØ | ØØØØØØØØ |
| ØØ34 | Ø34 | ØØØØØØØØ | ØØØØØØØØ | ØØØØØØØØ | ØØØØØØØØ | ØØØØØØØØ | ØØØØØØØØ | ØØØØØØØØ |
| ØØ35 | Ø35 | ØØØØØØØØ | ØØØØØØØØ | ØØØØØØØØ | ØØØØØØØØ | ØØØØØØØØ | ØØØØØØØØ | ØØØØØØØØ |
| ØØ36 | Ø36 | ØØØØØØØØ | ØØØØØØØØ | ØØØØØØØØ | ØØØØØØØØ | ØØØØØØØØ | ØØØØØØØØ | ØØØØØØØØ |
| ØØ37 | Ø37 | ØØØØØØØØ | ØØØØØØØØ | ØØØØØØØØ | ØØØØØØØØ | ØØØØØØØØ | ØØØØØØØØ | ØØØØØØØØ |
| ØØ38 | Ø38 | ØØØØØØØØ | ØØØØØØØØ | ØØØØØØØØ | ØØØØØØØØ | ØØØØØØØØ | ØØØØØØØØ | ØØØØØØØØ |
| ØØ39 | Ø39 | ØØØØØØØØ | ØØØØØØØØ | ØØØØØØØØ | ØØØØØØØØ | ØØØØØØØØ | ØØØØØØØØ | ØØØØØØØØ |

Listing #4
(Concluded)

| PC | ADD | PROM #7 | PROM #6 | PROM #5 | PROM #4 | PROM #3 | PROM #2 | PROM #1 |
|---|---|---|---|---|---|---|---|---|
| ØØ3A | Ø3A | ØØØØØØØØ | ØØØØØØØØ | ØØØØØØØØ | ØØØØØØØØ | ØØØØØØØØ | ØØØØØØØØ | ØØØØØØØØ |
| ØØ3B | Ø3B | ØØØØØØØØ | ØØØØØØØØ | ØØØØØØØØ | ØØØØØØØØ | ØØØØØØØØ | ØØØØØØØØ | ØØØØØØØØ |
| ØØ3C | Ø3C | ØØØØØØØØ | ØØØØØØØØ | ØØØØØØØØ | ØØØØØØØØ | ØØØØØØØØ | ØØØØØØØØ | ØØØØØØØØ |
| ØØ3D | Ø3D | ØØØØØØØØ | ØØØØØØØØ | ØØØØØØØØ | ØØØØØØØØ | ØØØØØØØØ | ØØØØØØØØ | ØØØØØØØØ |
| ØØ3E | Ø3E | ØØØØØØØØ | ØØØØØØØØ | ØØØØØØØØ | ØØØØØØØØ | ØØØØØØØØ | ØØØØØØØØ | ØØØØØØØØ |
| ØØ3F | Ø3F | ØØØØØØØØ | ØØØØØØØØ | ØØØØØØØØ | ØØØØØØØØ | ØØØØØØØØ | ØØØØØØØØ | ØØØØØØØØ |

Earlier herein it was stated that the table 68 in FIG. 9D performs the function of a look up table in converting the six bits per pixel value of input thereto to one bit per pixel output therefrom. In the embodiment described, the table 68 consists of an 8K×1 PROM with the $A_0$ to $A_5$ inputs thereto receiving the 6 bit pixel value and the $A_6$ to $A_{12}$ inputs thereto receiving the 7 most significant bits of the sum of pixel values within the window 54. An address is provided for every possible pixel value and, similarly, for every possible sum of pixel values within the window 54. In other words, the pixel value ranges from zero to 63 and the sum within the window 54 ranges from zero to 127. From these values, the PROM address=the window sum times $2^6$ plus the center pixel value. The output bit of the table 68 will be a binary zero or a one depending upon the comparison of the associated center pixel value plus the threshold value (earlier discussed herein) vs. the sum of the pixel values within the window 54 divided by $19^2$ (to produce an average pixel value for the entire window 54). In other words, the output bit of table 68 is zero if the center pixel plus the threshold value is less than $1/19^2$ times the sum of pixels in the window 54, and the output bit is one if the center pixel plus the threshold value is greater than or equal to $1/19^2$ times the sum of the pixels in window 54. Because every combination of the window 54 sum and the center pixel value is determined, the PROM associated with the table 68 contains a set of output bits which exactly correlates any window sum with any center pixel and generates the appropriate output required for the threshold. In the embodiment described, the threshold value was selected to be 7, although this value could be changed according to the principles discussed earlier herein.

I claim:

1. An apparatus for reducing the gray scale resolution of a document comprising:
   means for scanning said document along x and y coordinates with regard thereto for generating pixels representing gray scale values for discrete areas of said document along said x and y coordinates; each said pixel having a predetermined number of binary bits;
   means for summing the associated pixels within a matrix of said pixels along said x and y coordinates, with said matrix being hereinafter referred to as a window to produce a window sum as said window is moved relatively along coordinates corresponding to said x and y coordinates; and
   means for comparing a selected pixel within a said window with the associated said window sum and predetermined criteria and for generating first and second outputs in accordance with said comprising; said first and second output values having fewer binary bits than the associated said selected pixel.

2. The apparatus as claimed in claim 1 in which said predetermined criteria represents a threshold value and said first output is generated when the selected pixel and said threshold value are less than an associated average pixel from said window sum and said second output is generated when the selected pixel and said threshold value are greater than or equal to said average pixel from said window sum.

3. The apparatus as claimed in claim 2 in which said scanning means, summing means, and comparing means are used for reducing the gray scale resolution of the front side of said document, and said apparatus further comprises second scanning means, second summing means and second comparing means corresponding to said first named scanning means, summing means and comparing means, respectively, for reducing the gray scale resolution of the rear side of said document.

4. An apparatus for reducing the gray scale resolution of a document comprising:
   means for scanning said document along x and y coordinates with regard thereto for generating pixels representing gray scale values for discrete areas of said document along said x and y coordinates; each of said pixel having a predetermined number of binary bits;
   means for summing the associated pixels within a matrix of said pixels along said x and y coordinates, with said matrix being hereinafter referred to as a window to produce a window sum as said window is moved relatively along coordinates corresponding to said x and y coordinates;
   means for comparing a selected pixel within a said window with the associated said window sum and predetermined criteria and for generating first and second outputs in accordance with said comparing; said first and second output values having fewer binary bits than the associated said selected pixel;
   said predetermined criteria representing a threshold value and said first output being generated when the selected pixel and said threshold value are less than an associated average pixel from said window sum, and said second output is generated when the selected pixel and said threshold value are greater than or equal to said average pixel from said window sum;
   said summing means further comprising means for storing said pixels in columns and rows corresponding to said x and y coordinates; and
   said summing means further including second means for storing sums of rows of pixels within said window making up a said window sum whereby an oldest row of pixels within said window is subtracted from said window sum and a newest row of pixels is added to said window sum as said window is moved relatively along said y coordinate, with said newest row of pixels being defined as a next adjacent row of pixels (not yet included in said window sum) which is added to said window sum as said window is moved relatively along said y coordinate, and with said oldest row of pixels being defined as a row of pixels which is most distant from said next adjacent row (as measured along said y coordinate) but is still included within a said window sum.

5. The apparatus as claimed in claim 4 in which said comparing means includes a decoding device for receiving a selected pixel and a predetermined number of bits from an associated window sum and also for generating said first and second output values therefrom.

6. The apparatus as claimed in claim 5 in which said window contains a predetermined number of pixels along said x coordinate and a predetermined number of pixels along said y coordinate, with said selected pixel being centrally located within the associated said window.

7. The apparatus as claimed in claim 6 in which said summing means includes an arithmetic logic unit (ALU) for generating said window sum.

8. The apparatus as claimed in claim 4 in which said summing means includes third means for deleting said oldest row of pixels from and adding said newest row of pixels to said window sum and also includes means for deleting an oldest pixel from an associated sum for a row of pixels and for adding a newest pixel thereto as said window is moved relatively along said x coordinate, with said newest pixel being defined as a next adjacent pixel not yet included in the associated sum for said row of pixels as said window is moved relatively along said x coordinate, and with said oldest pixel being defined as a said pixel which is most distant from an associated said newest pixel (as measured along said x coordinate) but is still included within the associated sum for said row of pixels.

9. The apparatus as claimed in claim 8 in which said scanning means generates a predetermined number of pixels per scan and said summing means further comprises:

a buffer memory for storing a predetermined number of said sums of rows of pixels;

a scratch memory for storing said predetermined number of said scans;

a pixel buffer for storing said selected pixel; and means for transferring a next said scan of said pixels from said buffer memory and for adding it to said scratch memory as said window is moved relatively along said x coordinate, and for transferring said selected pixel from said buffer memory to said pixel buffer.

10. The apparatus as claimed in claim 9 in which said summing means further comprises:

an arithmetic logic unit (ALU) having a random access memory (RAM) associated therewith for storing said window sums.

11. The apparatus as claimed in claim 10 in which said comparing means includes:

a latch for receiving said selected pixel from said pixel buffer;

a decoding device for receiving said selected pixel and a predetermined number of bits for a window sum for an associated window from said RAM and for generating said first and second outputs therefrom.

12. The apparatus as claimed in claim 11 in which said window is comprised of an equal number of said pixels along said x and y coordinates and said first and second values are each represented by a single binary bit.

13. A method for reducing the gray scale resolution of a document comprising the steps of:

(a) scanning said document along x and y coordinates with regard thereto for generating pixels representing gray scale values for discrete areas of said document along said x and y coordinates;

(b) summing the associated pixels within a matrix of said pixels along said x and y coordinates, with said matrix being hereinafter referred to as a window to produce a window sum as said window is moved relatively along corresponding x and y coordinates; and (c) comparing a selected pixel within a said window with the associated window sum for generating a first output value when the selected pixel and a threshold value are less than an associated average pixel from said window sum and for generating a second output value when the selected pixel and said threshold value are greater than or equal to said average pixel from said window sum, whereby said first and second output values have fewer bits than the associated said selected pixel.

14. A method for reducing the gray scale resolution of a document comprising the steps of:

(a) scanning said document along x and y coordinates with regard thereto for generating pixels representing gray scale values for discrete areas of said document along said x and y coordinates;

(b) summing the associated pixels within a matrix of said pixels along said x and y coordinates, with said matrix being hereinafter referred to as a window to produce a window sum as said window is moved relatively along corresponding x and y coordinates;

(c) comparing a selected pixel within a said window with the associated window sum for generating a first output value when the selected pixel and a threshold value are less than an associated average pixel from said window sum and for generating a second output value when the selected pixel and said threshold value are greater than or equal to said average pixel from said window sum, whereby said first and second output values have fewer bits than the associated said selected pixel;

said summing step comprises the steps of:

(d) storing sums of rows of pixels within said window making up a said window sum;

(e) subtracting the sum for an oldest row of pixels within said window from said window sum; and (f) adding the sum for a newest row of pixels within said window to said window sum as said window is moved relatively along said y coordinate, with said newest row of pixels being defined as a next adjacent row of pixels (not yet included in said window sum) which is added to said window sum as said window is moved relatively along said y coordinate, and with said oldest row of pixels being defined as a row of pixels which is most distant from said next adjacent row (as measured along said y coordinate) but is still included within a said window sum.

15. The method as claimed in claim 14 in which said summing step comprises the steps of:

(g) subtracting an oldest pixel from the associated sum for a row of pixels and adding a newest pixel thereto as said window is moved along said x coordinate, with said newest pixel being defined as a next adjacent pixel not yet included in the associated sum for a said row of pixels as said window is moved relatively along said x coordinate, and with said oldest pixel being defined as a said pixel which is most distant from an associated said newest pixel (as measured along said x coordinate) but is still included within the associated sum for said row of pixels.

* * * * *

UNITED STATES PATENT AND TRADEMARK OFFICE
CERTIFICATE OF CORRECTION

PATENT NO. : 4,326,258

DATED : April 20, 1982

INVENTOR(S) : Mario F. de la Guardia

It is certified that error appears in the above-identified patent and that said Letters Patent are hereby corrected as shown below:

Column 57, lines 53-54, "comprising" should be --comparing--.

Column 58, line 11, delete "of".

Signed and Sealed this

*Twenty-ninth* Day of *March 1983*

[SEAL]

*Attest:*

GERALD J. MOSSINGHOFF

*Attesting Officer* *Commissioner of Patents and Trademarks*